(12) United States Patent
Bernier et al.

(10) Patent No.: US 8,827,543 B2
(45) Date of Patent: Sep. 9, 2014

(54) METHOD AND DEVICE FOR CONTROLLING PRODUCTION OF A MIXTURE OF COMPONENTS, IN PARTICULAR A MIXTURE WITH PRE-MIX DEAD VOLUMES

(71) Applicant: Total Raffinage Marketing, Puteaux (FR)

(72) Inventors: Michel Bernier, Quiberon (FR); Nicolas Petit, Sceaux (FR); Yann Creff, Les Cotes d'Arey (FR); Meriam Chebre, Septeme (FR)

(73) Assignee: Total Raffinage Marketing, Puteaux (FR)

( * ) Notice: Subject to any disclaimer, the term of this patent is extended or adjusted under 35 U.S.C. 154(b) by 0 days.

(21) Appl. No.: 13/769,006

(22) Filed: Feb. 15, 2013

(65) Prior Publication Data
US 2013/0255806 A1 Oct. 3, 2013

Related U.S. Application Data

(62) Division of application No. 12/303,024, filed as application No. PCT/FR2007/000886 on May 29, 2007, now Pat. No. 8,401,703.

(30) Foreign Application Priority Data

May 31, 2006 (FR) ...................................... 06 04868

(51) Int. Cl.
*G05D 11/13* (2006.01)
(52) U.S. Cl.
USPC .............................. 366/160.1; 366/16; 366/17

(58) Field of Classification Search
CPC ..................................................... G05D 11/139
USPC ........................... 366/16, 17, 160.1; 700/285
See application file for complete search history.

(56) References Cited

U.S. PATENT DOCUMENTS

| | | | |
|---|---|---|---|
| 3,385,680 A | 5/1968 | Feld et al. | |
| 3,473,008 A | 10/1969 | Bay et al. | |
| 5,430,295 A | 7/1995 | Le Febre et al. | |
| 6,113,256 A | 9/2000 | Bonissone et al. | |
| 6,159,255 A | 12/2000 | Perkins | |
| 2004/0221889 A1* | 11/2004 | Dreyer et al. .................. | 137/88 |

FOREIGN PATENT DOCUMENTS

FR 2 845 013 B1 4/2004

OTHER PUBLICATIONS

Smith, Carlos A., Corripio, Armando B., "Principles and Practice of Automatic Process Control," Wiley and Sons, 2nd Ed., pp. 92-95, 266-268, 579-580 (1997).

* cited by examiner

*Primary Examiner* — Alison Hindenlang
(74) *Attorney, Agent, or Firm* — Sughrue Mion, PLLC

(57) ABSTRACT

The invention relates to a method and a device for controlling the production of a mixture of components, especially a mixture with premix dead volumes.

The method and the device according to the invention ensure multivariable regulation feedback by a dynamic observer providing an estimate in real time of the properties of the components of the mixture, said estimate being sufficient to guarantee the effectiveness of the feedback loop. Thus, the desired properties of the mixture are guaranteed despite large uncertainties in the properties of the components on the one hand, and partial knowledge of the mixing process on the other.

7 Claims, 8 Drawing Sheets

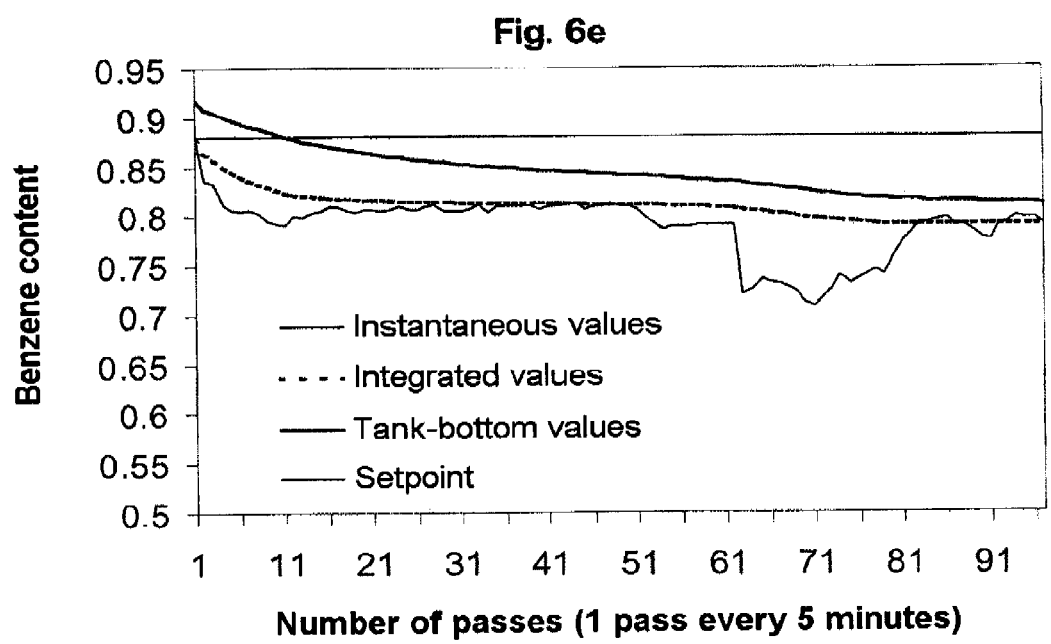

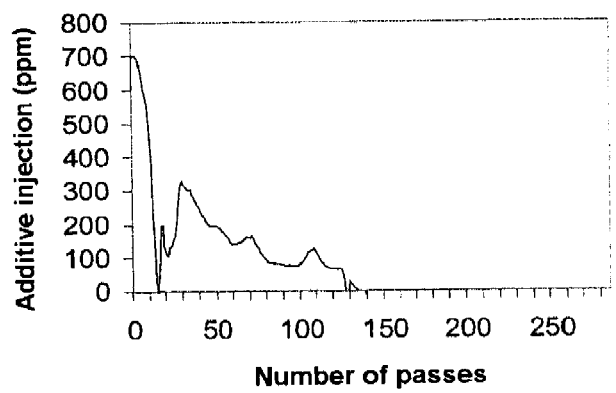
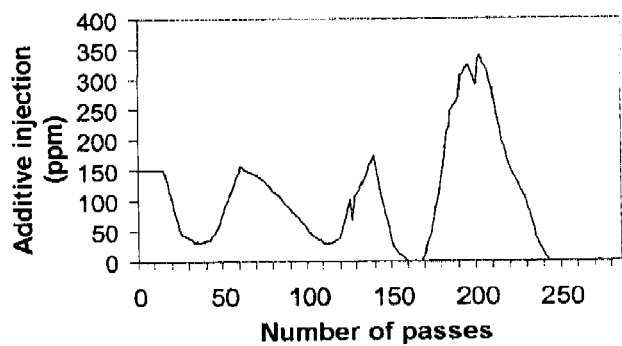
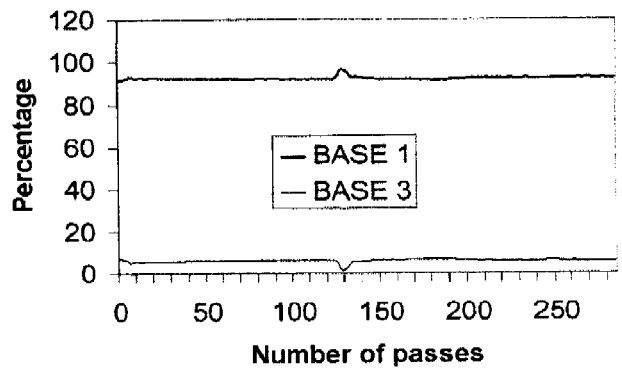

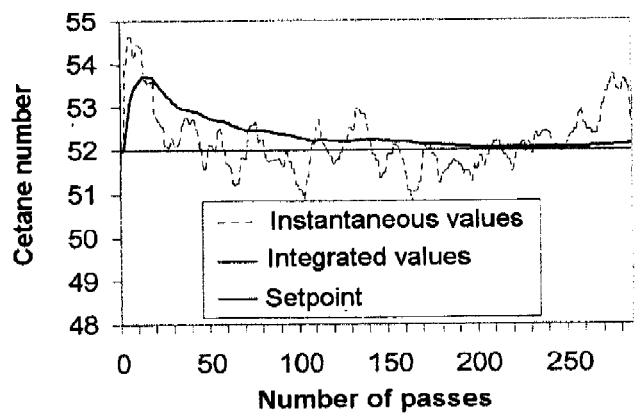
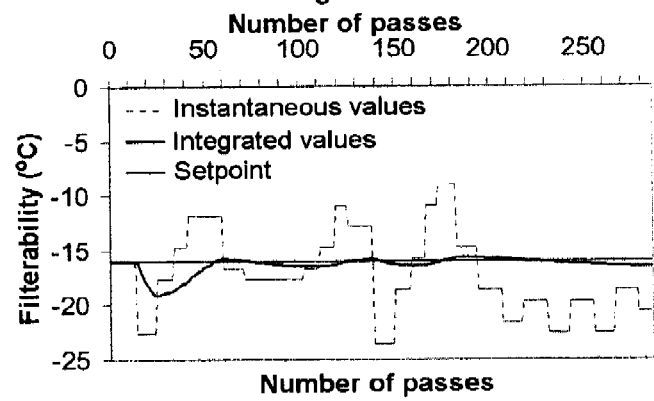
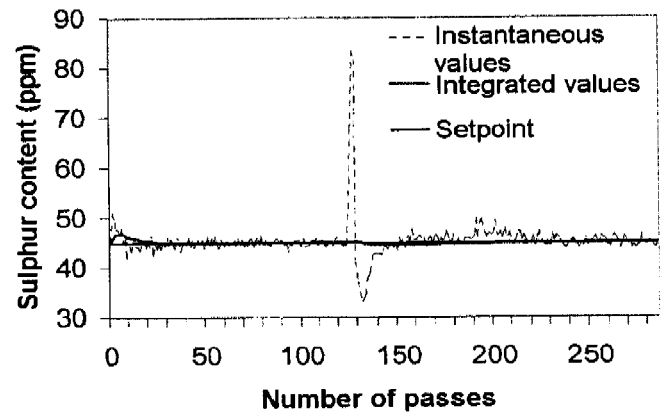

METHOD AND DEVICE FOR CONTROLLING PRODUCTION OF A MIXTURE OF COMPONENTS, IN PARTICULAR A MIXTURE WITH PRE-MIX DEAD VOLUMES

This is a Divisional Application of U.S. patent application Ser. No. 12/303,024, filed Dec. 1, 2008, which is a 371 National Stage of International Patent Application PCT/FR2007/000886, filed May 29, 2007, which claims priority to French Patent Application No. 0604868, filed May 31, 2006, the disclosures of which are incorporated herein in their entirety by reference.

The invention relates to a method and a device for controlling the production of a mixture of components, especially a mixture with premix dead volumes.

It applies more particularly to automatically regulating mixtures of components in line, such as for example mixtures of oil products, in which the mixtures produced comply with a set of specifications or significant parameters. In these applications, each product contained in the mixture acts on the set of characteristics or parameters of the final mixture obtained.

The invention applies in particular to the production of mixtures in which the characteristics or parameters of the various components are not well known or may change during production of the mixture. Mixtures of oil products in particular have these aspects, but the method and the system of the invention may apply to mixtures of products such as cements, paints, etc.

In all cases, the aim is to obtain a mixture having a state defined in advance or constitutional parameters that are defined in advance. These parameters relate to the physico-chemical characteristics of the mixtures to be obtained. In the case of a mixture of oil products for example, these parameters may be the sulphur content of the mixture, its octane number, etc. For a mixture of cements, the parameters will for example be the lime content, the silica ratio, the alumino-ferric ratio, etc.

Known methods and devices in the prior art make it possible to produce a mixture in line or in closed-loop mode, that is to say with feedback on the basis of information measured in real time, continuously or periodically, using measurement instruments (in-line analysers) placed downstream of the mixing plant (mixer). These methods and devices generally apply to flows of components coming from tanks of intermediate products.

A typical feedback procedure uses the deviation between a target setpoint and the measurement. This is an output return feedback procedure.

Another typical feedback procedure consists in correcting the predictions of the characteristics or parameters of the mixture, by adding to them a term that is the result of a first-order filtering of the difference between the measurement and the prediction without correction.

These typical feedback procedures have the drawback of being applied on the mixture output by the mixer and not on the characteristics of the components upstream of the mixer.

The regulations used generally take into account the constraints on the quality of the mixture to be manufactured, and also the constraints associated with the component feed channels (for example limits associated with the hydraulic constraints, such as the size of the pumps, homogeneity constraints on the calculated proportions, the sum of which must be equal to 1 over all the channels). They also allow the total mixture production outcoming flow rate to be controlled.

The known devices and devices have the drawback of meeting the various specifications of the mixture as a function of integrated (volume-averaged or cumulative) properties of the mixture in a holding tank for the mixture located immediately downstream of the mixer. This is because the properties of the mixture are generally measured on the instantaneous mixture at the mixer outlet, upstream of the holding tank for the mixture, these measurements making it possible to obtain an estimate of the integrated quality (flow exiting the mixer or entering the tank) which is the objective of the regulation in mixture-integrated mode or tank-integrated mode (the definition of these modes will be given later).

Although these methods and devices operating integratedly are well suited for conventional mixing areas, with tanks of components, possibly with flow-off, and a holding tank for the mixture, they are not sufficient for operation with direct continuous upstream flow of the components and, optionally, continuous direct delivery of the mixture produced, without passing via a holding tank.

This is because said methods and devices are dependent on the qualities of the components, which may vary, especially during a continuous upstream flow of the components.

Moreover, in a configuration with direct continuous downstream flow of the mixture, the proportions of the components of the mixture obtained by the known devices are corrected by taking into account the volume of mixture present in the holding tank. Thus, during production of a given volume of mixture in the holding tank, the properties of the mixture are liable to vary greatly, which would not be acceptable in the case of direct continuous delivery of the mixture.

Another drawback of the known devices and methods is that they cannot easily manage unfeasible situations by an optimum compromise solution. That is to say, when one or more constraints cannot be met, the solution obtained results in a mixture in which the deviation from the required specifications cannot be correctly controlled.

The conventional feedback methods are also insufficient for managing the synchronization of the plants for premixing the components upstream, in particular in the case of multiple premixing operations in series and/or in parallel. This is because such premixing operations generate a delay in the flows of certain components that require the use of large manufacturing margins so as to meet the specifications of the mixture in the holding tank, but which result in unnecessary and expensive overquality. Furthermore, this lack of synchronization may result in surging (oscillations), leading to improper stressing of the control members, possibly resulting in their premature wear.

Finally, the known methods and devices generally regulate, independently, on the one hand the proportion of the components and on the other hand the injection of additives in order to adjust the specifications of the mixture in a decoupled manner. This regulation independence precludes any economizing on expensive injections of additives.

The known methods and devices also control the total outcoming flow rate of the mixer, taking into account the high and low limit constraints associated with hydraulic limitations (size of the pumps in the chosen channels upstream and downstream of the mixer) and also associated with economic limitations (scheduling constraints), and in particular maximize the outcoming flow rate so as to shorten the manufacturing times, while automatically reducing the rate in the case of an active constraint on the applicability of the calculated recipe.

The objective of the present invention is to provide a method of controlling the production of a mixture, and a corresponding device, remedying these drawbacks.

In particular, the control method according to the invention provides a multivariable regulation feedback procedure by a dynamic observer for estimating, in real time, the properties of the components of the mixture, sufficient to guarantee the effectiveness of the feedback loop. Thus, the desired properties of the mixture are guaranteed despite large uncertainties in the properties of the components on the one hand, and partial knowledge of the mixing process on the other.

For this purpose, a first subject of the invention is a method for controlling the production of a mixture M of n components, the method making it possible to determine the proportions u of the components involved in the mixture so as to obtain a number m of predetermined properties y of the mixture, the values of which lie between predetermined minimum and maximum thresholds and/or, for m' of them (where m'≤n−1), are substantially equal to predetermined target values, characterized in that it comprises the following steps:

(i) at time t=0:
(1) a matrix B representing a number m of properties y of the n components is determined,
(2) a reference recipe $\bar{u}$ is determined from the predetermined minimum and maximum thresholds and/or from the predetermined target values, such that the properties $B\bar{u}$ of the mixture lie between said predetermined thresholds and/or, for m' of them, are equal to said predetermined target values, $\bar{u}$, being a vector of dimension n, representing the proportions of the various components involved in the composition of the mixture, where $$\sum_{i=1}^{n} \bar{u}_i = 1,$$

(3) the recipe is applied to the components so as to produce a mixture M;
(ii) at time t'=t+Δt:
(1) the properties $y_{mes}$ of the mixture M obtained by applying the recipe calculated at the previous time are measured,
(2) a corrected matrix $\hat{B}$, representing the estimate of the properties of the components, is deduced therefrom,
(3) a new recipe u is determined in such a way that the properties $\hat{B}u$ of the mixture lie between said predetermined thresholds and/or, for m' of them, are equal to said predetermined target values,
(4) this new recipe u is applied to the components;
(iii) at time t''=t'+Δt, operations (1) to (4) of the preceding step (ii) are repeated; and
(iv) step (iii) is repeated throughout the duration of production of the mixture.

Thus, at the start time t=0, a matrix B is determined, for example on the basis of the data supplied by the manufacturers of the components, or from laboratory measurements, followed by progressive updating as the mixture is being produced.

It should be noted that the predetermined minimum and maximum thresholds, and also the predetermined target values, may be modified during the mixing operation.

This method had the advantage of updating the estimate of the properties of the components, thereby making it possible to take into account the variations in their properties over the course of time so as to maintain the desired specifications of the mixture. This novel approach makes it possible to factor out inaccuracies and uncertainties in the properties of the components due to measurement errors, to defects/contaminations, to incomplete homogenization or to stratification of the tanks, or to variability over time of the various components. This method may thus be advantageously used in plants with a direct upstream continuous flow of the components.

Advantageously, the properties $y_{mes}$ of the mixture that are measured during operation (1) of step (ii) are measured by means of a continuous measurement procedure on the mixture produced. The term "continuous measurement procedure" is understood to mean either a measurement carried out continuously when its nature so allows, or a succession of samples being removed and measurements made on these samples.

These instantaneous measurements on the mixture, right from its formation, make it possible to use the method for a plant in which the mixture is directly delivered in a continuous fashion. The method is then in instantaneous mode.

The method according to the invention has the advantage of being able to operate in integrated mode, the measurements then being able to be accumulated or volume-averaged in a tank for holding the mixture. It is also possible to switch from integrated mode to instantaneous mode (or conversely) during production of the mixture.

For example, this switching may be carried out manually by an operator so as to modify the required regulation mode during mixing.

The switching may also be carried out automatically, in sequence, for example at the end of mixing, when a flowed volume has been reached, and by taking into account the remaining volume to be manufactured. This configuration is used in particular for guaranteeing direct delivery by an oil pipeline, or else to guarantee the quality of the entire residual product in the lines, in the case of large line volumes between a mixer and a tank for storing the end product located in a remote storage area.

Advantageously, at a predetermined time during the production of the mixture, one or more properties of the components are measured and the matrix B representing the properties of the components is updated. It is thus possible, without having to reset the method, to update by measuring one or more properties of a component. This makes it possible to improve the estimate of the property or properties of this component. The rate of updating may be adjustable, property by property, for each component.

Preferably, during operation (2) of step (ii), the corrected matrix $\hat{B}$ is determined using the following equation:

$$\frac{d\hat{B}_j^t}{dt} = -\beta_j H u(y_j - y_j^{mes}), \quad (1)$$

where
the matrix H is a positive definite symmetric matrix having the objective of ensuring normalization taking into account the measurement-prediction deviation, allowing component quality prediction deviation calculation;
$B_j^t$ is the transpose of $B_j$; and
$\beta_j$, a strictly positive real number, is a constant for setting the convergence time, allowing the rate of convergence of the estimate to be differentiated property by property.

This constant $\beta_j$ is used to differentiate the rate of convergence of the estimate, property by property, and in particular makes it possible to take into account the specific features of the measurement delay specific to each property.

As examples of $\beta_j$ settings, values equal to two to four times the pure delay may be taken.

For example, for a property such as the octane number associated with a measurement delay of 10 minutes, β will be set to 20 minutes.

For a property such as the percentage distilled at 70° C. associated with a measurement delay of 40 minutes (in-line chromatography), β may be set to 80 minutes.

Various choices of matrix H, which will remain symmetric and positive definite, are possible for ensuring that such a device converges.

For example, it is possible to use the following matrix H, which introduces a normalization factor based on the initial reference recipe:

$$\frac{1}{\|\overline{u}\|} \begin{pmatrix} \frac{1}{\overline{u}_1} & & \\ & \ddots & \\ & & \frac{1}{\overline{u}_n} \end{pmatrix}$$

The normalization performed by the matrix H is particularly important for factoring out physical scale effects from one property to another, and different variation sensitivities specific to each property.

This normalization then allows the calculated prediction deviations (after scale effects have been factored out) to be better modulated, it being possible for this modulation to be performed, for example, proportionally to a term associated with the current recipe, with respect to a reference recipe.

Preferably, the control method according to the invention for the production of a mixture of components, in which at least one premix of at least two of the components is produced before production of the mixture, is characterized in that the recipe u determined during operation (3) of step (ii) takes into account the delays due to the dead volumes present in the plant in the premixing zones.

Such a synchronization makes it possible to improve the production of the mixture and the meeting of the property setpoints of the mixture. It also makes it possible to reduce the manufacturing margins, and thus control the flows of components more precisely, and to prevent overquality. Finally, this more precise control of the component flows limits surging, and consequently improper stressing of the control members of the plant. This synchronization also provides greater robustness in variations of the total outcoming flow rate of the mixer.

More particularly, during operation (2) of step (ii), the matrix $\hat{B}$ is determined using the following equation:

$$\frac{d\hat{B}_j^t}{dt} = -\beta_j H U(t)(y_j(t) - y_j^{mes}(t)), \qquad (2)$$

where $U(t) = (U_1(t), \ldots U_n(t))^t$, at time t, the recipe vector taking into account the dead volumes, and $$y(t) = \sum_{i=1}^{n} U_i(t) b_i,$$

$b_i$ being the vector of the properties of component i.

Advantageously, the command and output quantities involved in this equation are synchronized in order to take into account the premixing delay and the measurement delay.

This is because the premixing zones and the analysers cause delays. Depending on the property measured, the analyser delays may be considered as constants or variables, depending on the measured value. To compensate for these delays, the method according to the invention uses a synchronization device, which predicts the future values of the properties (on the basis of the characteristics of the components and of the last percentages calculated), knowing that the corresponding measurement that will be provided by the analyser is not yet available at this moment due to the analysis delay (which includes the delay in the sampling loop and the analyser delay).

For example, in the case of variable measurement delays, a look-up table for associating several values of delays in given operating intervals is used: a piecewise constant delay profile is then obtained, the level of delay varying automatically when the operating range is changed. This level of delay then causes a new synchronization of the predictions with the measurements.

Advantageously, in the control method according to the invention, the recipe u determined during operation (3) of step (ii) is determined by means of an optimization procedure comprising the following steps:

(a)—determination of the solution of a complete regulation problem P0, this solution consisting of an optimized recipe u taking into account the constraints on the proportions of the components and the constraints on the properties of the mixture, if the complete regulation problem P0 is solvable, application of the recipe u-solution of P0;

(b)—if the complete regulation problem P0 is not solvable, determination of a recipe u for which a minimal regulation problem P1 is solved, which takes into account only the constraints on the problem P0 that are defined as priority constraints; this problem P1 involves a succession of normally feasible optimization problems, the criteria of which consist in penalizing the violation of said priority constraints so as to define achievable new values for these priority constraints;

(c)—if the minimal regulation problem P1 is solvable, determination of a recipe u for which a regulation problem P2 is solved, which takes into account said achievable new values of the priority constraints of the problem P0 and also the non-priority constraints of the problem P0; this problem P2 involves an optimization problem, the criteria of which consist in penalizing the violation of said non-priority constraints so as to define achievable new values for these non-priority constraints, if the minimal regulation problem P1 is not solvable, application of the current recipe u (that is to say, the recipe applied before the optimization of step (ii));

(d)—if the regulation problem P2 is solvable, determination of a recipe u for which a regulation problem P3 is solved, which takes into account said achievable new values of the priority constraints of the problem P0 that were obtained in step (b), said achievable new values of the non-priority constraints obtained in step (c) and also all the other non-priority constraints of the problem P0 that are not treated by the problems P1 and P2; this problem P3 involves a succession of normally feasible optimization problems, the criteria of which consist in penalizing the violation of said other non-priority constraints so as to define achievable new values for these other non-priority constraints, if the regulation problem P2 is not solvable, application of the recipe obtained by the problem P1; and (e) if the regulation problem P3 is solvable, the applied recipe is the solution of the problem P3, otherwise the recipe is the solution of the problem P2.

The optimization sequences (a) to (e) ensure optimum management of the priorities, which makes it possible to deal with unfeasible problems by degrading them so as to obtain a set of feasible constraints. These optimization sequences have the novelty of seeking the solution of a minimal problem if the complete problem is unfeasible, then progressively increasing the number of constraints, instead of progressively reducing the number of constraints as in the conventional optimization sequences. In this way, it is possible to obtain a recipe u that always meets as best as possible the constraints defined as being priority constraints.

Advantageously, the non-priority constraints dealt with by the problem P2 relate to the references and are called "regulation" constraints corresponding to the fixed-setpoint regulation equations.

Advantageously, steps (b) and (d) are themselves optimization sequences that can be divided into steps, as described below.

Step (b) preferably consists of steps ($b_i$) in which the hard (priority) constraints of decreasing rank are dealt with in succession. During each step ($b_i$), the aim is to find an optimum relaxation providing the value of all the hard constraints of the same rank i, which become achievable constraints, taking into account the priority constraints on the proportions of the bases and the achievable constraints on the properties of the mixture of rank j>i, optionally relaxed at steps $b_j$ preceding the current step $b_i$.

Step (d) preferably consists of steps ($d_i$) in which the soft (non-priority) constraints of decreasing rank are dealt with in succession. During each step ($d_i$), the aim is to find an optimum relaxation providing the value of all the soft constraints of the same rank i, which become achievable constraints, taking into account the priority constraints on the proportions of the bases, the achievable constraints on the properties of the mixture of hard rank, optionally relaxed at steps ($b_i$), the achievable constraints, in terms of regulation target, on the on-target regulated properties calculated in step (c) and, finally, the achievable soft constraints on the properties of rank j>i, optionally relaxed at steps $d_j$ preceding the current step $d_i$.

Advantageously, the optimization sequence may include an additional step during which, if the previous regulation problem P3 is solvable, a recipe u is determined for which the regulation problem P0 is solved taking into account said achievable new values determined during steps (b), (c) and (d).

It is thus possible to ensure optimized orientation of the calculated recipe, for example by maximizing or minimizing certain components, in a hierarchized manner, or by minimizing the deviation between the recipe to be calculated and the initial reference recipe, as soon as sufficient degrees of freedom are available.

In certain cases, this additional step makes it possible nevertheless to obtain an optimum orientation of the recipe in respect of all the partially degraded initial constraints although the initial complete problem was unfeasible.

Advantageously, the priority constraints taken into account for solving the problem P1 are constraints on the proportions of the components and constraints on the properties of the mixture.

The constraints on the proportions of the components especially include simple limits on the proportions of the components and a constraint on the sum of the proportions of the components. The priority constraints on the properties of the mixture are optionally relaxed during the preceding iterations of P1. The desired solution is a recipe u for taking into account the optionally relaxed priority constraints on the properties of the mixture.

If the method is intended for a plant for producing a mixture of n components and of additives, for a property j of the mixture on which the additive has an influence, the control model takes into account the effect d of the additive addition during operations (2) and (3) of step (ii) according to: $y_j = \hat{B}_j u + d$.

The invention also relates to a device for producing and controlling a mixture of components, comprising transport channels for transporting the components to be mixed into a main channel connected to the place for receiving the mixture, means for controlling the flow rates of the components in each transport channel, means for continuously measuring, in the main channel, representative parameters of the mixture being produced, and means for calculating the proportions of the various components involved in the mixture, characterized in that it includes an estimator connected to the calculation means, the estimator comprising programmed means for producing an estimate of the properties of the components using the measurements of the properties of the mixture that are measured by the measurement means, the calculation means comprising programmed means for calculating, by means of this estimate, the proportions of the various components involved in the mixture so as to obtain a mixture having predetermined properties.

By "continuous measurement means" it is to be understood that the means are capable of implementing a continuous measurement procedure, as defined above.

Preferably, the estimator of the device comprises programmed means for implementing operations (1) and (2) of steps (i) and (ii) of the method according to the invention.

Advantageously, the estimator includes programmed synchronization means for taking into account the delays due to the dead volumes in the zones for premixing at least two components of the mixture.

As a variant, the estimator includes programmed synchronization means for taking into account the delays due to the dead volumes in various stages, at least one stage consisting of one or more zones for premixing at least two components of the mixture.

In other words, a stage is located between an inflow of components, whether mixed or not, and an outflow of components, whether mixed or not, and includes at least one premixing of at least two incoming components (it being possible for each of these components itself to be a mixture of components) delivering a premix of these components as output.

Preferably, these synchronization means are programmed to implement equation (2) of operation (2) of step (ii) of the method according to the invention in order to produce a mixture of components, in which at least one premix of at least two of the components is produced before the mixture is produced.

Advantageously, the device includes an optimizer connected to the calculation means and to a mixture-objectives storage means, the optimizer including programmed means for optimizing the recipe u of the proportions of the components and said recipe being determined by the calculation means as a function of the mixture objectives stored in said storage means.

Preferably, the optimizer then includes programmed means for implementing the optimization procedure of the production method described above.

Advantageously, the device includes at least one additive tank connected via a transport channel to the main channel, downstream of the zone for mixing the components, a means for controlling the additive flow rate associated with the tank provided in the transport channel, and an additive injection controller connected to said control means, to the optimizer and to the mixture-objectives storage means, the additive injection controller being capable, for a property j of the mixture on which an additive has an influence, of optimizing the proportion of the additive so as to regulate said corresponding property j of the mixture, taking into account a target supplied by the mixture-objectives storage means.

The invention will now be described by means of examples and with reference to the appended non-limiting drawings in which:

FIGS. 6a-6e show the variation, as a function of time, of the proportions of the bases (FIG. 6a) and of the qualities of the petrol mixture of example 8, namely the RON regulations (FIG. 6b) and RVPD regulations (FIG. 6c) and monitoring of the zone for the percentage distilled (FIG. d) and for the benzene content (FIG. 6e);

FIGS. 7a-7e represent the variation, as a function of time, of the following parameters of the gasoil mixture with regulation by the injection of additives of example 9:

FIG. 7a: injection profile of the dope influencing the cetane number,

FIG. 7b: injection profile of the dope influencing the filterability,

FIG. 7c: ratio of bases 1 and 3 used in the production of the mixture,

FIG. 7d: cetane number of the mixture,

FIG. 7e: filterability of the mixture, and

FIG. 7f: sulphur content of the mixture.

The invention will be described below in the case of oil plants for producing mixtures containing defined proportions of several available bases or components, so that the combination of the properties of these bases gives the mixture the desired properties complying with the extremes or a setpoint value.

Figure 1:
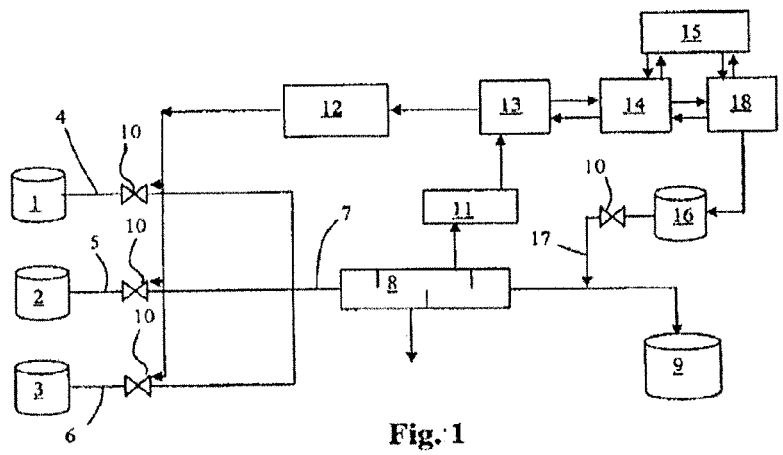
FIG. 1 is a schematic representation of a device for producing a mixture of products according to the invention.

FIG. 1 shows a diagram of a device for controlling the production of a mixture of products according to the invention.

The components or bases of the mixture are contained in tanks 1, 2, 3, the number of which has been limited to three for ease of representation. The components to be mixed are conveyed along transport channels 4, 5, 6 to a main channel 7 provided with a mixer 8, the main channel conveying the mixture to a holding tank 9. Means denoted by the reference 10 in FIG. 1 are used to control the flow rates of the bases in each transport channel. These are for example flow regulators controlling a valve.

Analysis means 11, or continuous measurement means, are used for repeatedly measuring the representative parameters of the mixture during its production. These means 11 consist for example of in-line analysers connected to the mixer 8 located in the main channel 7.

In the case of a mixture of oil products, these analysers measure for example the sulphur content of the mixture (sulphur measurement), the octane number (octane engine test), the cetane number (cetane engine test), etc.

The plant also includes means 12 for calculating the proportions (recipe u) of the bases involved in the mixture, an estimator 13 and an optimizer 14 for determining a recipe u of the proportions of the bases, which will be sent to the control means 10.

The role of the estimator 13 is to estimate the properties of the bases on the basis of the analyses of the properties of the mixture performed by the analysis means 11, the calculation means 12 comprising programmed means for calculating, by means of this estimate and of setpoint values of these properties or values of constraints associated with these properties, the proportions of the various bases involved in the mixture, so as to obtain a mixture having predetermined properties. The proportions of the bases to be applied are calculated repeatedly, at predetermined time intervals, which are not necessarily equal (for example around 5 minutes), thus allowing the properties of the mixture to be precisely controlled.

The estimator 13 includes programmed means for implementing the operations of determining the properties of the components, forming part of the method of producing the mixture according to the invention described above.

The role of the optimizer 14 is to optimize a recipe u of the proportions of the bases from the estimated properties of the bases, from constraints on the recipe u and from constraints on the properties of the mixture. The recipe u thus optimized can serve for operating the control means 10.

The optimizer 14 includes programmed means for implementing the method of optimizing the calculated recipe for implementation by the estimator of the control method according to the invention.

The device furthermore includes a mixture-objectives storage means 15. This mixture-objectives storage means contains the various objectives set by the user in order to obtain the desired mixture. It is connected to the optimizer 14 so as to transmit the desired targets for each mixture.

In the example, these are the initial reference recipe, targets of the setpoint type or high and low limits on the properties, minimum/maximum constraints on the proportions of components, minimum/maximum desired orientations on the components, the volume to be manufactured and the chosen mode of regulation (instantaneous mode, integrated mode or tank-integrated mode, as will be defined later).

The device according to the invention may also include an additive tank 16 connected via a transport channel 17 to the main channel 7, downstream of the mixer 8. A means 10 for controlling the additive flow rate is also provided in the transport channel 17. This means 10 is actuated by an additive injection controller 18 connected to the optimizer 14 and to the mixture-objectives storage means 15.

The role of the additive injection controller 18 is to optimize a recipe for dope injection from the tank 16, so as to regulate a given property, in parallel with optimization of the recipe of components 1 to 3 performed by the optimizer 14, knowing that, in the event of saturation of dope injection (for example when a consumption limit predefined by users has been reached), automatic switching of the dope-regulated property takes place on the multivariable regulation by acting on the proportions of the components, this being controlled by the optimizer 14.

Of course, several additive tanks 16 may be envisaged.

The device according to the invention may operate in two modes:

—Integrated-analysis Control (Integrated Mode)

This control is well suited for the case in which the mixture flows into an isolated end-product tank (holding tank). In this case, it is the average quality integrated over the entire tank that is controlled.

The proportions of the bases are then controlled so as to modify the instantaneous properties of the mixture in order to compensate for the deviations in quality of the mixture observed in the past, so as to bring the properties of the entire mixture contained in the holding tank to the setpoint values, or to within the constraints.

The actions for controlling the proportions of the bases then increase at the same time as the volume of the mixture in the holding tank.

A distinction is made here between "mixture-integrated" mode and "tank-integrated" mode. The latter mode takes into account the volume and quality of the initial tank bottom before mixing, whereas the "mixture-integrated" mode operates on the manufactured product flowing from the mixer, the qualities of this mixture product to be controlled being integrated, that is to say cumulated or averaged from the onset of mixing.

—Instantaneous-analysis Control (Instantaneous Mode)

This control is well suited in the case in which the mixture flows directly into an oil pipeline, a ship, a train or a lorry. It is then important for the instantaneous values of the analyses to be permanently kept close to the setpoints or within the constraints. In this case, the actions for controlling the proportions of the bases are independent of the volume of mixture that has flowed.

The operation of the property estimator 13 is independent of the regulation mode chosen, whether instantaneous or integrated. In both modes, the estimator calculates, instantaneously and synchronously, a prediction of the properties, which can then be used by the optimizer 14. The optimization procedure employed by the optimizer uses regulation equations explained later, which involve either a setpoint corresponding directly to the desired target in instantaneous mode, or a reference calculated over a path modulated by an adjustable horizon in integrated mode.

Examples 1 to 5 describe formulae that can be used to implement the invention.

These examples relate, respectively, to the following: feedback without premixing; feedback with premixing; optimization sequences; management in integrated mode; regulation by additives.

The feedback described in example 1 takes into account the in-line analysers, this being the basis of the regulation principle. In particular, it estimates, in real time, the properties of the components, using a mechanism for correcting the properties of the components according to a preferential orientation (new laboratory analysis of the properties of the components) or not.

This feedback is supplemented in example 2 so as to allow synchronization of the control, in the case of multiple premixing, in parallel (at the same stage) or in series (in several successive premixing stages). This allows a more robust control to be obtained in practice, as this is less subject to oscillations resulting from any lack of synchronization between measurement and prediction, and its use to be enlarged for component premixing cases.

The feedback procedures presented in example 1 or example 2 are used to calculate the predictions of the properties of the mixture. These predictions are used as constraint equations in optimization sequences, such as those presented in example 3, and make it possible to calculate the appropriate control for achieving the objectives set for the mixture.

Example 1 or 2 and example 3 therefore describe an example of a required processing chain in instantaneous mode.

Example 4 makes it possible to provide a specific complement to the processing in integrated mode, which uses the operating diagram of the instantaneous mode presented with reference to examples 1 to 3, by modifying the thresholds (relaxation of the instantaneous constraint values) and modifying the references (setpoints modified via reference paths).

Example 5 describes regulation by additive injection, which is added to the mechanisms of example 1 or 2 and example 3 and which may use mechanisms similar to those of the integration mode described in example 4. The principle of switching regulation toward the bases y is mentioned, which corresponds to a pathway from the mechanism described in example 5 to that described in examples 1 to 3.

Example 6 describes various recipe optimization options.

In the case of a mixture of n bases (or components), the following notations are used:

u, a vector of dimension n, is the recipe to be calculated and $\bar{u}$ is the reference recipe. The recipe represents the proportions of the various bases involved in the mixture: $u \in [0,1]^n$ and $$\sum_{i=1}^{n} u_i = 1;$$

y, a vector of dimension m, represents the m estimated properties of the mixture for the recipe u;

$y_j^{mes}$ represents the measurement of the property j, with $y_j^{mes} = B_j u$, assuming linear mixing laws. It may be noted here that the equality y=Bu applies only in the case without premixing (dynamic or steady-state, that is to say in transient or steady-state mode) and in the steady-state case if there is premixing;

B is the m×n matrix of the properties of the components of the mixture; and $\hat{B}$ is the estimate of B used in the calculations, in such a way that $y = \hat{B}u$.

The current properties y of the mixture at the exit of the mixer are called instantaneous properties. They are measured by the in-line analysers.

The current properties of the flowed product, denoted by z, are called integrated properties.

The current properties of a holding tank for the mixture, denoted by zfb, are called tank bottom-integrated properties.

EXAMPLE 1

Feedback without Premixing, Control in Instantaneous Mode

The aim of this example is to show how equation (1), used for implementing operation (2) of step (ii) of the method for producing and controlling a mixture according to the invention, makes it possible to calculate a matrix of estimation of the base properties. This example corresponds to the case in which the bases are mixed directly, in order to produce the mixture without premixing.

Defining the following dynamic system for updating $\hat{B}_j$ on the basis of u and the measurement $y_j^{mes}$:

$$\frac{d\hat{B}_j^t}{dt} = -\beta_j H u(y_j - y_j^{mes}), \quad (1)$$

where the matrix H is a positive definite symmetric matrix and equal in this example to:

$$\frac{1}{\|u\|}\begin{pmatrix} \frac{1}{u_1} & & \\ & \ddots & \\ & & \frac{1}{u_n} \end{pmatrix}$$

$B_j^t$ is the transpose of $B_j$, and
$\beta_j$ is a strictly positive real number,
it is possible to show that the function $\psi(\hat{B}_j) = \frac{1}{2}(\hat{B}_j - B_j)H^{-1}(\hat{B}_j - B_j)^t$ is a Lyapunov function for the dynamic system (1). This is because it is positive and its derivative as a function of time is negative:

$$\frac{d\psi}{dt} = -\beta_j(y_j - y_j^{mes})^2.$$

Therefore $\hat{B}_j^t$ tends towards the largest invariant set by the dynamic system (1) lying within $\{\hat{B}_j^t$ such that $d\psi/dt=0\}$. Thus, $\hat{B}_j^t$ tends towards a value such that $y_j = y_j^{mes}$, which is equivalent by definition to $\hat{B}_j u = B_j u$. Nevertheless, since the values of u are bound by the constraint $$\sum_{i=1}^{n} u_i = 1,$$

it is not possible to conclude that $\hat{B}_j$ and $B_j$ are equal.

However, when an optimization problem includes a constraint $\hat{B}_j u = y_j^{ref}$ and when a solution does exist, then $y_j^{mes} = y_j^{ref}$ asymptotically. Similarly, the inequality constraints posed on the estimate $y_i$ are respected by the measurement $y_j^{mes}$.

The use of the dynamic system (1) for updating the properties of the mixture thus constitutes a feedback system which makes it possible to avoid, in the case of the outputs, shifts between estimates and measurements.

A variant in the use of the dynamic system (1) would be to use an initial reference recipe deviation term e and not a recipe u term in the estimate differential equation.

When the measurement is delayed, and the delay is known, it is sufficient to synchronize the quantities u, $y_j$ and $y_j^{mes}$ in order for the convergence properties to remain valid.

Apart from the analyser measurement delays, the synchronization may take into account the component delay(s) upstream of the mixer.

Such a delay is for example observed in the case of premixing the components, as described below.

EXAMPLE 2

Feedback with Premixing, Control in Instantaneous Mode

This example is similar to example 1, but corresponds to the case in which certain bases are premixed before they are mixed with other bases to form the desired mixture.

Figure 2:
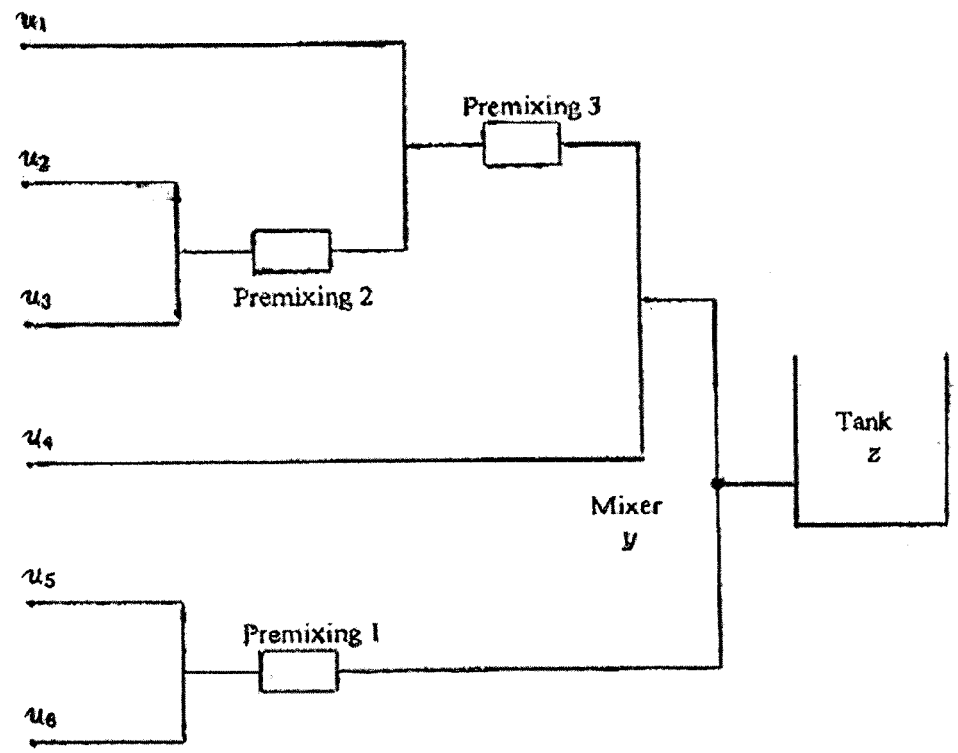
FIG. 2 is an example of the topography of a six-base mixture, comprising three premixes.

FIG. 2 shows an example of a six-base mixing topography.

Consider a plant comprising p premixing operations denoted by 1 to p. Let:
- $Q_i(t)$ be the volume flow rate of the base i at time t, with $i \in \{1, \ldots n\}$;
- $Q_{n+i}(t)$ be the total volume flow rate passing through the dead volume associated with the premixing operation i at time t, with $i \in \{1, \ldots p\}$ (the incoming flow rate is always equal to the outgoing flow rate);
- $Q(t)$ be the total volume flow rate through the mixer at time t, $$Q(t) = \sum_{i=1}^{n} Q_i(t),$$

- $V_i$ be the dead volume associated with the premixing operation i; and
- $b_i$ be the vector of the properties of the base i, $b_j^E(t)$ (and $b_{jS}(t)$ respectively) be the vector of the properties upon entering (and exiting respectively) the premixing operation j at time t. By convention, for a base $b_i$: $b_j^E(t) = b_j^S(t)$.

Let a path $\Pi_i$ be associated with each base i, said path being defined by the series of $p_i$ dead volumes through which this base passes in order to reach the mixer. This path is a series of different integers $p_i$ which relate to the numbering indices for the premixing operations, $\Pi_i = \{\pi_i^1, \pi_i^2, \ldots, \pi_i^{pi}\}$, with $\pi_i^j \in \{1, \ldots, p\}$ for any $j \in \{1, \ldots, p_i\}$. $\Pi_i = \emptyset$, $p_i = 0$, means that the base i is injected directly into the mixer.

In the case of FIG. 2, we have:
$\Pi_1 = \{3\}$, $p_1 = 1$,
$\Pi_2 = \{2,3\}$, $p_2 = 2$
$\Pi_3 = \{2;3\}$, $p_3 = 2$
$\Pi_4 = \emptyset$, $p_4 = 0$
$\Pi_5 = \{1\}$, $p_5 = 1$
$\Pi_6 = \{1\}$, $p_6 = 1$.

For any premixing operation i, we define the set $\Gamma_i$ of its $q_i$ incoming flow rates. This is a set of $q_i$ different integers which relate to the indices for numbering the volume flow rates, $\Gamma_i = \{\gamma_i^1, \gamma_i^2, \ldots, \gamma_i^{qi}\}$, with $\gamma_i^j \in \{1, \ldots, n+p\}$, for any $j \in \{1, \ldots, q_i\}$.

In the case of FIG. 2, we have:
$\Gamma_1 = \{5,6\}$, $q_1 = 2$
$\Gamma_2 = \{2,3\}$, $q_2 = 2$
$\Gamma_3 = \{1,6+3\} = \{1,9\}$, $q_3 = 2$.

For $\Pi_i = \emptyset$, the properties $b_i$ are involved in the weighted form $Q_i(t)/Q(t)b_i$ in the expression for the properties of the mixture in the form of a linear combination of the properties of the bases.

Let us now turn to the case $\Pi_i \neq \emptyset$.

For the premixing operation $\pi_i^j$, the total flow rate is $$Q_{\pi_i^j}(t) = \sum_{k \in \Gamma_{\pi_i^j}} Q_k(t).$$

The input property $b_{\pi_i^1}^E(t)$ is given by:

$$b_{\pi_i^1}^E(t) = \frac{\sum_{j \in \Gamma_{\pi_i^1}} b_j^E Q_j(t)}{\sum_{j \in \Gamma_{\pi_i^1}} Q_j(t)}.$$

In this input, the term in $b_i$ occurs in the form:

$$\frac{Q_i(t)}{\sum_{j \in \Gamma_{\pi_i^1}} Q_j(t)} b_i = \frac{Q_i(t)}{Q_{\pi_i^1}(t)} b_i.$$

As output, we have $b_{\pi_i^1}^S(t) = b_{\pi_i^1}^E(t - \delta_{\pi_i^1}(t))$, the pure delay $\delta_{\pi_i^1}(t)$ being defined by:

$$V_{\pi_i^1} = \int_{t-\delta_{\pi_i^1}(t)}^{t} Q_{\pi_i^1}(\tau) d\tau. \tag{3}$$

The term in $b_i$ therefore occurs in $b_{\pi_i^1}^S(t)$ in the form:

$$\frac{Q_i(t - \delta_{\pi_i^1}(t))}{Q_{\pi_i^1}(t - \delta_{\pi_i^1}(t))} b_i.$$

Similarly, we have, for the premixing operation $\pi_i^2$:

$$b_{\pi_i^2}^E(t) = \frac{\sum_{j \in \Gamma_{\pi_i^2}} b_j^E Q_j(t)}{\sum_{j \in \Gamma_{\pi_i^2}} Q_j(t)},$$

i.e., for the term in $b_i$ in $b_{\pi_i^2}^S(t)$ $$\frac{Q_{\pi_i^1}(t)}{Q_{\pi_i^2}(t)} \frac{Q_i(t - \delta_{\pi_i^1}(t))}{Q_{\pi_i^1}(t - \delta_{\pi_i^1}(t))} b_i.$$

For $b_{\pi_i^2}^S(t) = b_{\pi_i^2}^E(t - \delta_{\pi_i^2}(t))$ the term in $b_i$ occurs in the form:

$$\frac{Q_{\pi_i^1}(t - \delta_{\pi_i^2}(t))}{Q_{\pi_i^2}(t - \delta_{\pi_i^2}(t))} \frac{Q_i(t - \delta_{\pi_i^2}(t) - \delta_{\pi_i^1}(t - \delta_{\pi_i^2}(t)))}{Q_{\pi_i^1}(t - \delta_{\pi_i^2}(t) - \delta_{\pi_i^1}(t - \delta_{\pi_i^2}(t)))} b_i.$$

We see compositions of delays in the paths $\Pi_i$ appear. Let us define the functions: $\Delta_i^j(t): t \mapsto t - \delta_{\pi_i^j}(t)$, for any $\pi_i^j$ in $\Pi_i$, the composition of these functions at fixed j is defined by:

$$\Delta_i^{k,j}(t) \triangleq \Delta_i^k(\Delta_i^j(t)): t \mapsto t - \delta_{\pi_i^j}(t) - \delta_{\pi_i^k}(t - \delta_{\pi_i^j}(t))$$

$$\Delta_i^{l,k,j}(t) \triangleq \Delta_i^l(\Delta_i^{k,j}(t))$$

and
With these definitions, the formula for the term $b_i$ in $b_{\pi_i^2}^S(t)$ is given by:

$$\frac{Q_{\pi_i^1}(\Delta_i^2(t))}{Q_{\pi_i^2}(\Delta_i^2(t))} \frac{Q_i(\Delta_i^{1,2}(t))}{Q_{\pi_i^1}(\Delta_i^{1,2}(t))} b_i.$$

On leaving the final premixing operation $\pi_i^{p_i}$, we have, for $b_{\pi_i^{p_i}}^S(t)$ in $b_i$:

$$\frac{Q_{\pi_i^{p_i-1}}(\Delta_i^{p_i}(t))}{Q_{\pi_i^{p_i}}(\Delta_i^{p_i}(t))} \frac{Q_{\pi_i^{p_i-2}}(\Delta_i^{p_i-1,p_i}(t))}{Q_{\pi_i^{p_i-1}}(\Delta_i^{p_i-1,p_i}(t))} \cdots \frac{Q_{\pi_i^1}(\Delta_i^{2,\ldots,p_i}(t))}{Q_{\pi_i^2}(\Delta_i^{2,\ldots,p_i}(t))} \frac{Q_i(\Delta_i^{1,2,\ldots,p_i}(t))}{Q_{\pi_i^1}(\Delta_i^{1,2,\ldots,p_i}(t))}$$

and, finally, in the mixture, denoting by $U_i(t)$ the $b_i$ factor term:

$$U_i(t) = \frac{Q_{\pi_i^{p_i}}(t)}{Q(t)} \frac{Q_{\pi_i^{p_i-1}}(\Delta_i^{p_i}(t))}{Q_{\pi_i^{p_i}}(\Delta_i^{p_i}(t))} \frac{Q_{\pi_i^{p_i-2}}(\Delta_i^{p_i-1,p_i}(t))}{Q_{\pi_i^{p_i-1}}(\Delta_i^{p_i-1,p_i}(t))} \cdots \tag{4}$$

$$\frac{Q_{\pi_i^1}(\Delta_i^{2,\ldots,p_i}(t))}{Q_{\pi_i^2}(\Delta_i^{2,\ldots,p_i}(t))} \frac{Q_i(\Delta_i^{1,2,\ldots,p_i}(t))}{Q_{\pi_i^1}(\Delta_i^{1,2,\ldots,p_i}(t))}.$$

Hence $U_i(t) = u_i(t) = Q_i(t)/Q(t)$ for $\Pi_i \neq \emptyset$, and the output is expressed as:

$$y(t) = \sum_{i=1}^{n} U_i(t) b_i \tag{5}$$

Thus, for the premixed cases, equation (1) of the dynamic system becomes:

$$\frac{d\hat{B}_j^t}{dt} = -\beta_j H U(t)(y_j(t) - y_j^{mes}(t)), \tag{2}$$

with $U(t) = (U_1(t), \ldots, U_n(t))^t$, the $U_i(t)$ values being defined by equation (4) and $y(t) = (y_1(t), \ldots, y_m(t))^t$ by equation (5).

The function used in the case without premixing remains a Lyapunov function for this new dynamic and demonstrates the convergence of $\hat{B}U$ towards $BU$.

EXAMPLE 3

Optimization Sequences

The control method according to the invention uses an optimization procedure to determine the recipe u during sub-step (3) of step (ii). This optimization procedure comprises the above-mentioned steps (a) to (d). The optimization procedure is implemented by the optimizer 14 and delivers an optimized recipe u to the estimator 13 in order to determine the recipe to be applied to the control means 10 of the device.

An example of the operation of the optimization procedure used to optimize the recipe u will be described below with reference to FIG. 3.

Notations:

We consider the following subsets of M={1, 2, ..., m}, the set of indices assigned to the outputs:
- R, the subset of output indices for which references calculated in integrated mode or setpoints in instantaneous mode are specified;
- $H_m$, the subset of output indices for which minimum limits called "hard" limits, that is to say limits that must as a priority be respected, are specified;
- $H_M$, the subset of output indices for which hard maximum limits are specified;
- $S_m$, the subset of output indices for which minimum limits called "soft" limits, that is to say non-priority limits, are specified; and
- $S_M$, the subset of output indices for which soft maximum limits are specified.

What are assumed to be able to be associated with each output are at most a reference (or setpoint), a minimum (hard or soft) limit and a maximum (hard or soft) limit. Implicitly therefore, $H_m \cap S_m = \emptyset$ and $H_M \cap S_M = \emptyset$.

Moreover, the estimated effects of the additives are assumed to be taken into account in the value of the references and of the constraints.

The equalities that have to be taken into account in respect of the references $y_i^{réf}$ are:

$$y = y_i^{réf}, \forall i \in R.$$

Let $\hat{B}_R$ be the matrix extracted from $\hat{B}$ by keeping only the rows that correspond to the indices belonging to R. By introducing the vectors $y_R$ and $y_R^{réf}$, this set of inequalities is rewritten as $y_R = \hat{B}_R u = y_R^{réf}$. This is a constraint on the unknown u.

The set of constraints on the outputs are given by:

$$\begin{cases} y_i \geq y_i^{min} & \forall i \in H_m \\ y_i \leq y_i^{max} & \forall i \in H_M \\ y_i \geq y_i^{min} & \forall i \in S_m \\ y_i \leq y_i^{max} & \forall i \in S_M \end{cases}$$

Let $\hat{B}_{H_m}$ be the matrix extracted from $\hat{B}$ by keeping only the rows relating to the indices belonging to $H_m$. By introducing the vectors $y_{H_m}$ and $y_{H_m}^{min}$, the first set of inequalities is rewritten as $y_{H_m} = \hat{B}_{H_m} u \geq y_{H_m}^{min}$. This is a constraint on the unknown u. Via similar notations, $$\begin{cases} \hat{B}_{H_m} u \geq y_{H_m}^{min} \\ \hat{B}_{H_M} u \leq y_{H_M}^{max} \\ \hat{B}_{S_m} u \geq y_{S_m}^{min} \\ \hat{B}_{S_M} u \leq y_{S_M}^{max} \end{cases}$$

this set of inequalities is of course equivalent to $$\begin{cases} -\hat{B}_{H_m} u \leq -y_{H_m}^{min} \\ \hat{B}_{H_M} u \leq y_{H_M}^{max} \\ -\hat{B}_{S_m} u \leq -y_{S_m}^{min} \\ \hat{B}_{S_M} u \leq y_{S_M}^{max} \end{cases}$$

Let:

$$B_H = \begin{pmatrix} -B_{H_m} \\ B_{H_M} \end{pmatrix} \; B_S = \begin{pmatrix} -B_{S_m} \\ B_{S_M} \end{pmatrix} \; y_H^{max} = \begin{pmatrix} -y_{H_m}^{min} \\ y_{H_M}^{max} \end{pmatrix} \; y_S^{max} = \begin{pmatrix} -y_{S_m}^{min} \\ y_{S_M}^{max} \end{pmatrix}.$$

The set of inequalities is finally given by:

$$\begin{cases} \hat{B}_H u \leq y_H^{max} \\ \hat{B}_S u \leq y_S^{max} \end{cases}$$

Consequently, in accordance with the abovementioned notations, the notations $y_P = \hat{B}_P u \leq y_P^{Max}$ are used for any set P of indices associated with these outputs. For a single output of index j, the notation is simply $y_j = \hat{B}_j u$.

The initial optimization problem P0 (complete problem) consists in finding the recipe u closest to a reference recipe $\bar{u}$, while still meeting the set of constraints on u. This problem does not necessarily have a solution. If it does not have a solution, it is necessary nevertheless to produce a new recipe, which is obtained according to the invention by sequentially solving several successive optimization problems:
- firstly (problem P1), the admissible values for the hard constraints on the outputs are sought, by proceeding iteratively from the highest-priority hard constraints towards the lowest-priority hard constraints;
- secondly (problem P2), the admissible values for the references are sought; and
- finally (problem P3), the admissible values for the soft constraints on the outputs are sought, by proceeding iteratively from the highest-priority soft constraints towards the lowest-priority soft constraints.

Table 1 describes an example of the optimization sequences.

TABLE 1 optimization sequences P0 to P3

|  |  | P0 | P1 | P2 | P3 |
|---|---|---|---|---|---|
| Recipe optimization |  | criterion |  |  |  |
| Min/Max analyser | Soft | constraint |  |  | criterion |
|  | Hard | constraint | criterion | achievable constraint | achievable constraint |
| Analyser setpoints |  | constraint |  | criterion | achievable reference |
| Rate/Min/Max Bases |  | constraint | constraint | constraint | constraint |
| Channel sum = 100% |  | constraint | constraint | constraint | constraint |

The minima/maxima of the bases used as permanent priority constraints are with respect to values in proportions, knowing that the hydraulic minima/maxima are expressed in m³/h, using the total outcoming flow rate of the mixer.

The rates of change (ROCs) are typically around 25%.

To produce a petrol-type mixture, the hard minima are typically the density, the octane number and the percentage distilled, while the hard maxima are typically the sulphur content, the density, the vapour pressure, the volatility, the benzene content, the content of olefins and the content of aromatics. And conversely for the soft minima and maxima, except for the density, which has its minimum and maximum thresholds as hard thresholds.

To produce a gasoil-type mixture, the soft minima are typically the sulphur content, the density, the filterability and the cloud point, while the soft maxima are typically the flash point, the cetane number and the percentage distilled. And conversely for the hard minima and maxima.

To produce a mixture of the fuel oil type, the hard minima are typically the viscosity and the hard maxima are typically the viscosity, the sulphur content and the density.

The various successive problems explained in detail below may be used.

Initial problem P0

The initial problem P0 is used in implementing step (a) of the optimization procedure described above. The solution of this complete regulation problem P0 consists of an optimized recipe u taking into account the constraints on the proportions of the components and the constraints on the properties of the mixture.

This problem consists in meeting the set of constraints on the recipe and on the outputs, and also the references on the outputs, while being the least possible distance away from the reference recipe, in the least-squares sense.

The problem to be solved is thus:

$$\min_u \|u - \bar{u}\|^2$$

$$\begin{cases} u^{min} \leq u \leq u^{max} \\ \sum_{i=1}^n u_i = 1 \\ \hat{B}_R u = y_R^{ref} \\ \hat{B}_H u \leq y_H^{max} \\ \hat{B}_S u \leq y_S^{max} \end{cases}$$

The optimization problem formulated here, as optimization variable, a recipe vector u that it is desired to calculate.

An alternative consists in posing a similar optimization problem with, as optimization variable, a deviation vector e for the deviation between the initial reference recipe and the recipe u of the proportions of the components.

When this problem has a solution u*, it is applied. If this is not the case, the three problems P1 to P3 described below are solved in succession.

For this problem P0, the constraints to be met are:

(1) constraints on the proportions of the bases:

hydraulic constraints (inequalities): each channel i may deliver a flow rate between $F_i^{min}$ and $F_i^{max}$. For a current flow rate F, it is necessary, for each base, that:

$$u_i^{p,min} = \frac{F_i^{min}}{F} \leq u_i \leq u_i^{p,max} = \frac{F_i^{max}}{F}$$

scheduling constraints (inequalities): they correspond to the minimum and maximum incorporations of each base (the sum of the proportions of which is equal to 1). For the instantaneous mode, this results in minimum constraints $u_i^{0,min}$ and maximum constraints $u_i^{0,max}$.

incorporation variation constraints (inequalities): the proportion of each base i cannot change in proportion downwardly by more than $\delta u_i^b$ and upwardly by more than $\delta u_i^h$. Thus, if the proportion at the preceding feed is $u_i$, the current command must be greater than $u_i^{\delta,min} = u_i(1-\delta u_i^b)$ and less than $u_i^{\delta,max} = u_i(1-\delta u_i^h)$.

constant total outcoming flow rate equality constraint (the sum of the proportions of the bases must be equal to 1);

(2) constraints on the properties of the mixture:

inequality constraints associated with the regulation equations expressing that the measured value y must meet its setpoint $y_{sp}$ (possibly able to be formulated in the form of inequality constraints by introducing tolerances—a formulation of the equality constraint type is required if there is no recourse to these tolerances);

inequality constraints for keeping the measured property values within a minimum/maximum range so as to meet the specifications and limit overspecification.

In this problem, the intended criterion may be expressed as a deviation with respect to the initial recipe that it is desired to minimize, while still ensuring that all the abovementioned constraints have been met.

When the problem P0 is not solvable (infeasibility of the mixing to take into account all the required specifications), an optimization sequence in three steps P1, P2 and P3 is initiated.

Problem P1: Management of the Hard Constraints The problem P1 is implemented during step (b) of the optimization procedure described above.

A recipe u is thus determined for which the minimal regulation problem P1 is solved, which takes into account only constraints on the problem P0 that are defined as priority constraints. This problem P1 involves a succession of normally feasible optimization problems, the criteria of which consist in penalizing the violation of said priority constraints, so as to define achievable new values for these priority constraints.

These criteria correspond to inequality-type hierarchized priority constraints on the properties monitored, preferably hierarchized constraints of hard rank with priority with respect to the regulation objectives and incurring costs involved in not meeting the quality specifications.

This problem P1 relates to managing the hard constraints (constraints on the proportions of the bases and priority constraints on the properties of the mixture) in an iterative manner by decreasing priorities. Since several constraints may have the same priority, iterative management works by the set of constraints of equal priority.

Associated with each constraint is a rank. By convention, the lower the rank associated with the constraint, the lower the priority of the constraint. Positive ranks are associated with priority constraints, while negative ranks are associated with non-priority constraints.

Consider a partition of $H = H_m \cup H_M$ into p all-non-empty subsets $H_i$, each grouping together indices corresponding to outputs subject to hard constraints of equal priority. By construction, $p \leq \text{card}(H), \cup_{i=1}^p H_i = H$ and $H_i \cap H_j = \emptyset, \forall j \neq i$. The constraints relating to $H_j$ are of lower priority than those relating to $H_i$ whenever $i < j$. It should also be noted that $H_{1j} = \cup_{i=1}^j H_j$.

Iteration 1: treatment of the highest-priority constraints associated with $H_1$.

The following must be solved:

$$\min_{u,\zeta}\|\hat{B}_{H_1}u + \zeta - y_{H_1}^{max}\|^2$$

$$\begin{cases} u^{min} \leq u \leq u^{max} \\ \zeta \geq 0 \\ \sum_{i=1}^{n} u_i = 1 \end{cases}$$

where $\zeta$ is a deviation variable vector (or slack vector) which makes it possible to increase the dimension of the optimization vector $(u, \zeta)$ and to calculate an optimum deviation corresponding to the relaxation of constraints.

This problem has a solution when the initial value of u meets the limits and the equality constraint on the sum of its elements, which is always the case.

The solution $(u^*, \zeta^*)$ allows the optimization problem to be relaxed, where appropriate.

By iterating over the card $(H_1)$ elements $\zeta_j$ of $\zeta$, the achievable values $y_{H_1}^{max,att}$ are defined as follows:

if $\zeta_j > 0$, then the achievable value is the initial value of the constraint;

if $\zeta_j = 0$, then the achievable value is $\hat{B}_j u^*$.

Iteration k+1:

At the $(k+1)^{th}$ iteration, the following problem is solved:

$$\min_{u,\zeta}\|\hat{B}_{H_{k+1}}u + \zeta - y_{H_{k+1}}^{max}\|^2$$

$$\begin{cases} u^{min} \leq u \leq u^{max} \\ \zeta \geq 0 \\ \sum_{i=1}^{n} u_i = 1 \\ \hat{B}_{H_{1k}}u \leq y_{H_{1k}}^{max,att} \end{cases}$$

This problem always has a solution since achievable values have been defined at the k preceding iterations for the constraints relating to the sets $H_1$ to $H_k$.

Like the preceding iterations, the solution $(u^*, \zeta^*)$ makes it possible to relax the optimization problem, where appropriate. By iterating over the card $(H_{k+1})$ elements $\zeta_j$ of $\zeta$, the achievable values $y_{H_{k+1}}^{max,att}$ are defined in the following manner:

if $\zeta_j > 0$, then the achievable value is the initial value of the constraint; and if $\zeta_j = 0$, then the achievable value is $\hat{B}_j u^*$.

The problem is entirely solved when the p subassemblies of constraints of decreasing priority have been addressed during the p iterations.

Thus, the sequence P1 is used, by successive optimizations, to solve the hard constraints (constraints on the proportions of the bases and positive-ranked constraints on the properties of the mixture). In the case of infeasibility, the constraints of lowest priority rank are relaxed. The ranks are used when it is not possible to meet all that is required. The hard constraints have a higher weight than the fixed-setpoint regulation objectives. The soft constraints of negative rank are ignored. The recipe optimization remains inactive in this sequence.

Problem P2: Management of the References

The problem P2 is involved during step (c) of the optimization procedure described above.

Thus, a recipe u is determined for which the regulation problem P2 is solved, which takes into account said achievable new values of the priority constraints of the problem P0 and also the non-priority constraints of the problem P0. This problem P2 involves an optimization problem, the criteria of which consist in penalizing the violation of said non-priority constraints so as to define achievable new values for these non-priority constraints.

These criteria correspond to equality constraints on the fixed-setpoint regulated priorities, preferably non-priority soft-rank constraints relative to the regulation objectives, but incurring an overquality.

This sequence comprises the set of hard constraints, with limits the value of which may have been relaxed during the sequence P1. The problem P2 seeks to satisfy as close as possible the regulation equations even if it entails, where appropriate, relaxing the setpoint as an achievable setpoint. These equations are all dealt with simultaneously (this sequence P2 is not iterative).

An orientation of the relaxations is nevertheless possible by introducing, into the criterion, a weighting vector using relative weights characteristic of the relative importance of the properties, so as preferentially to relax the least important properties.

The soft constraints of negative rank are ignored and optimization of the recipe remains inactive.

The problem to be solved is:

$$\min_{u}\|\hat{B}_R u - y_R^{ref}\|^2$$

$$\begin{cases} u^{min} \leq u \leq u^{max} \\ \sum_{i=1}^{n} u_i = 1 \\ \hat{B}_H u \leq y_H^{max,att} \end{cases}$$

This problem always has a solution $u^*$ since all the hard constraints have been relaxed during solution of the problem P1. The achievable references are calculated as $y_R^{réf,att} = \hat{B}_R u^*$.

Problem P3: Management of the Soft Constraints

The problem P3 is involved during step (d) of the optimization procedure described above.

A recipe u is determined for which a regulation problem P3 is solved, which takes into account said new achievable values of the priority constraints of the problem P0 that are obtained in step (b), said new achievable values of the non-priority constraints obtained in step (c) and all the other non-priority constraints of the problem P0 that are not treated by problems P1 and P2. This problem P3 involves a succession of normally feasible optimization problems, the criteria of which consist in penalizing the violation of said other non-priority constraints so as to define achievable new values for these other non-priority constraints.

These criteria correspond to inequality-type hierarchized non-priority constraints on the properties monitored.

This problem relates to managing the soft constraints iteratively. This involves sequential management by packets of constraints of decreasing priority. In a manner similar to problem P1, the subsets $S_i$ of $S = S_m \cup S_M$ are introduced.

Iteration 1: treatment of the highest-priority constraints associated with $S_1$.

The following have to be solved:

$$\min_{u,\varsigma} \|\hat{B}_{S_1} u + \varsigma - y_{S_1}^{max}\|^2$$

$$\begin{cases} u^{min} \leq u \leq u^{max} \\ \varsigma \geq 0 \\ \sum_{i=1}^{n} u_i = 1 \\ \hat{B}_H u \leq y_H^{max,att} \\ \hat{B}_R u = y_R^{Réf,att} \end{cases}$$

The solution $(u^*, \varsigma^*)$ makes it possible to relax the optimization problem where appropriate. By iterating over the card $(S_1)$ elements $\varsigma_j$ of $\varsigma$, the achievable values $y_{S_1}^{max,att}$ are defined as follows:
  if $\varsigma_j > 0$, then the achievable value is the initial value of the constraint;
  if $\varsigma_j = 0$, then the achievable value is $\hat{B}_j u^*$.
Iteration k+1:
At the $(k+1)^{th}$ iteration, the following problem is solved:

$$\min_{u,\varsigma} \|\hat{B}_{S_{k+1}} u + \varsigma - y_{S_{k+1}}^{max}\|^2$$

$$\begin{cases} u^{min} \leq u \leq u^{max} \\ \varsigma \geq 0 \\ \sum_{i=1}^{n} u_i = 1 \\ \hat{B}_H u \leq y_H^{max,att} \\ \hat{B}_R u = y_R^{Réf,att} \\ \hat{B}_{S_{1k}} u \leq y_{S_{1k}}^{max,att} \end{cases}$$

Like the previous iterations, the solution $(u^*, \varsigma^*)$ makes it possible to relax the optimization problem where appropriate. By iterating over the card $(S_{k+1})$ elements $\varsigma_j$ of $\varsigma$, the achievable values $y_{S_{k+1}}^{max,att}$ are defined in the following manner:
  if $\varsigma_j > 0$, then the achievable value is the initial value of the constraint;
  if $\varsigma_j = 0$, then the achievable value is $\hat{B}_j u^*$.
The problem is entirely solved when the subsets of decreasing-priority constraints have all been addressed.

This sequence P3 makes it possible to take into account, if possible, the soft constraints, depending on their rank, while satisfying the (optionally relaxed) regulation equations, with constraints on the proportions of the bases and optionally relaxed hard constraints on the properties of the mixture.

The constraints of identical rank are treated simultaneously in the optimization sequences. The recipe optimization remains inactive.

The overall solution of the optimization problem is completed after the last iteration of problem P3, the part $u^*$ of the solution of which is the calculated command to be applied to the mixer.

Preferably, for each problem, non-violation of the constraints on the proportions of the bases and non-violation of the constraint on the sum of the proportions of the bases, which must be equal to 1, are guaranteed. These constraints are therefore always taken into account.

Figure 3:
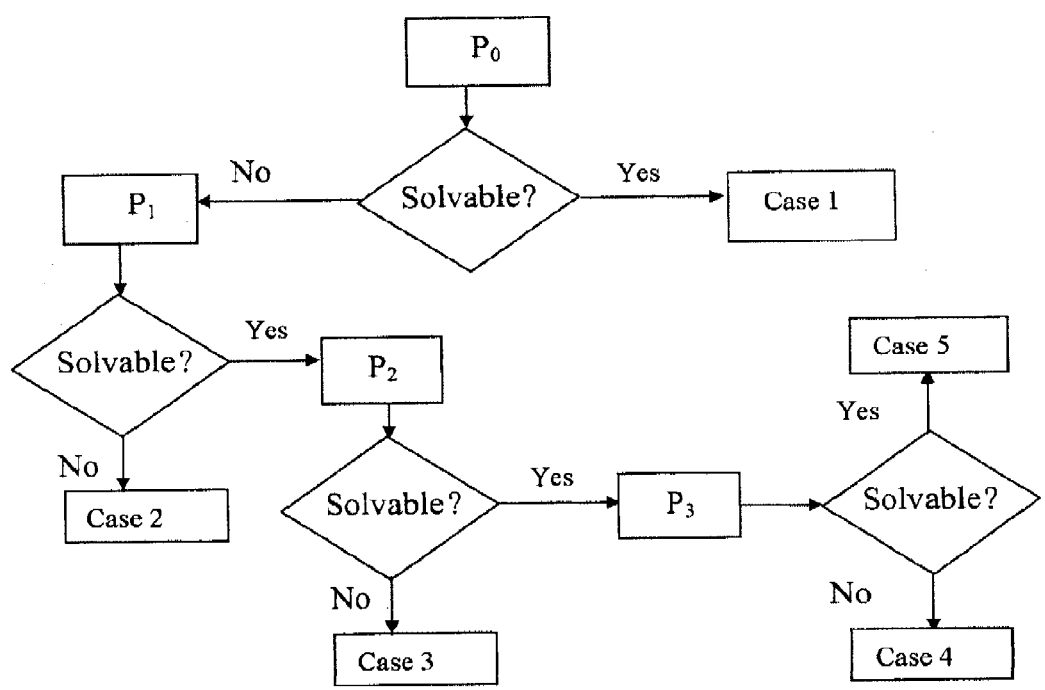
FIG. 3 shows an example of the sequencing of the optimization problems.

FIG. 3 shows the sequencing of the optimization problems P0 to P3 defined above.

If numerical resolution of the initial problem P0 has not provided a solution, the sequential resolution of problems P1, P2 and P3 is initiated. Although theoretically these problems always have a solution, their numerical resolution may fail. The recipe applied to the method depending on the resolution failures is the following (see FIG. 3):
  Case 1: the recipe applied is the result of the initial optimization problem;
  Case 2: the recipe applied is the actual recipe;
  Case 3: the recipe applied is the result of the calculation of P1;
  Case 4: the recipe applied is the result of the calculation of P2; and
  Case 5: the recipe applied is the result of the calculation of P3.

When the numerical resolution of problems P1 to P3 fails and upon persistent relaxation of hard constraints when solving problem P1, monitoring of the outputs is activated. This monitoring consists in checking that:
  the outputs $y_i$ associated with a setpoint $y^c_i$ remain within the range lying between $y_i^c - t^c$ and $y_i^c + t^c$, where $t^c$ is a tolerance defined by the user; and
  the outputs associated only with minimum limits $y^{min}$ and/or maximum limits $y^{max}$ do not exceed the values $y^{min} - t^{min}$ and/or $y^{max} + t^{max}$, where $t^{min}$ and $t^{max}$ are thresholds defined by the user.

If a threshold is exceeded, the command for the mixture is stopped.

It should be noted that the optimization problems are coded using the deviation e relative to the initial recipe $u^o$, and not directly in the variable u.

In contrast, the property estimator itself is coded using a coding in u and not in deviation e, thereby dispensing with the use of the initial mixing-onset measurements, which are often subject to inaccuracies.

In addition, the coding in the variable u according to the invention is perfectly compatible with the feedback procedure according to the invention described above.

It will be noted that a scaling of the equations involved in the optimization problems proposed gets round the problems of numerical conditioning, taking into account possibly different orders of magnitude of the properties in question.

This scaling consists in using a multiplicative scale factor applied to the right-hand and left-hand sides of the various constraints.

This factor is adjusted according to the property in question:

This scaling operation is performed using, as normalization value, an average of the extreme (minimum and maximum values) of the qualities of the components (when the property is not associated with a setpoint value).

Also used as normalization value is an average of the average of the extreme (minimum and maximum) values of the qualities of the components on the one hand and a possible setpoint value (when the property is associated with a setpoint value).

Furthermore, a normalization is also applied in the optimization criteria P1, P2, P3.

The norm used corresponds to a quadratic form defined by a diagonal matrix, the diagonal terms of which are inverse squares of the calculated scale factors.

EXAMPLE 4

Optimization in Integrated Mode a. Constraints on the Properties of the Mixture When the control mode is the instantaneous mode, the constraints defined on the properties of the mixture by the user are those used for the optimization, in particular, the objectives are setpoints supplied directly by the user.

In integrated control mode, the user may consider that what counts is management of the constraints not on the characteristics of the instantaneous mixture, but on the characteristics of the total volume that has flowed into the tank from the start of mixing in mixture-integrated mode and on the characteristics of the total volume of the tank in tank-integrated mode. This leaves latitude in the definition of the instantaneous constraints used for the optimization.

It is obviously possible to take the values defined by the user for the constraints associated with the total volume that has flowed, but these may be relaxed, as the following lines explain in detail.

If the current integrated value of the property of the mixture is denoted by $z^k$ and that at the $(k+1)^{th}$ iteration is denoted by $z^{k+1}$, for a current volume $V^k$, a current flow rate $F^k$ and an elapsed period T (or several periods likened to a sliding horizon), the current value $y^k$ of the property at the output of the mixer makes it possible to connect $z^k$ to $z^{k+1}$ whereby:

$$V^k z^k + F^k T y^k = (V^k + F^k T) z^{k+1}.$$

If the constraint supplied by the user is $z^{max}$ (the treatment described is similar in the case of the minimum constraints), at the current iteration, the following must apply:

$$y^k \leq \frac{(V^k + F^k T) Z^{max} - V^k Z^k}{F^k T}$$

The right-hand side of this inequality provides a maximum limit for $y^k$, which may be very different from $z^{max}$, but may however be used to avoid overconstraining the instantaneous command by choosing $y^{max} = z^{max}$. In contrast, it is undesirable to apply this limit when it is too different from $z^{max}$: a relaxation of $y^{max}$ larger than $z^{max}$+t is not allowed, $z^{max}$ being the constraint applied by the user and t being a tolerance also defined by the user.

b. Management of the References

In instantaneous mode, the regulated properties are the properties in the exit of the mixer. In this case, the references used during the optimization are equal to the setpoints defined by the user.

In tank-bottom-integrated mode, the regulated properties are the properties of the holding tank into which the mixture flows. The setpoints defined by the user relate to the properties of the tank. For the optimization, the references are calculated from these setpoints.

It is also possible to regulate some properties in instantaneous mode and others in integrated mode.

The case in which the mixture holding tank is empty at the start of mixing (or "mixture"-integrated mode, to distinguish from "tank-integrated mode").

Notations:

$y_j(t)$, the value of the property j at the exit of the mixer at time t;

$z_j(t)$, the value of the integrated property j of the flowed volume, corresponding here to the integrated property j of the mixture at time t;

V(t), the volume that has flowed since the start of mixing, corresponding here to the volume of the mixture at time t; and F(t), the total volume flow rate through the mixer at time t.

By simple mass balance:

$$\frac{dV(t)}{dt} = F(t) \text{ and } \frac{d(V(t)z_j(t))}{dt} = F(t)y_j(t).$$

For times $t_0$ and $t_1$, where $t_1 \geq t_0$, if $y_j$ and F are constant between $t_0$ and $t_1$, then:

$$V(t_1) = V(t_0) + F(t_0)(t_1 - t_0), \text{ and}$$

$$F(t_0)(t_1 - t_0)y_j(t_0) + V(t_0)z_j(t_o) = (V(t_o) + F(t_0)(t_1 - t_0))z_{j(t1)}$$

Defining a reference amounts to calculating the constant value $y_j^{réf}$ that the property at the exit of the mixer must take so that, at the end of time H (the sliding horizon chosen by the user) starting from the current time t, the integrated property $z_j$ passes from its current value $z_j(t)$ to its setpoint value $z_j^c$.

Thus, the following applies:

$$F(t)H y_j^{réf} + V(t)z_j(t) = (V(t) + F(t)H)z_j^c$$

that is, $$y_j^{réf} = z_j^c + \frac{V(t)}{F(t)H}(z_j^c - z_j(t)).$$

At each iteration, the reference is updated on the basis of this formula (sliding horizon).

The case in which the mixture holding tank is not empty at the start of mixing.

The calculation of the paths has to be modified.

If the initial volume is $V_0$ and the initial value of the property j in the tank is $z_{j0}$, then:

$$F(t)H y_j^{réf} + V(t)z_j(t) + V_0 z_{jo} = (V_0 + V(t) + F(t)H)z_j^c$$

where V(t) is the volume that has flowed since the start of mixing, corresponding here to the volume of the mixture at time t.

To avoid a jump in the reference, it is preferable to take into consideration, progressively, and not in a single go, the volume at the bottom of the tank.

To do this, a virtual setpoint $z_j^{cv}$ is defined, such that:

$$z_j^{cv} = z_j^c + a \frac{V_0}{V(t) + F(t)H}(z_j^c - z_{jo})$$

When a is equal to 0, there is no tank bottom.

When a is equal to 1, the entire tank bottom is taken into account. It therefore suffices to make a pass from 0 to 1 along a predetermined certain path in order to progressively take into account the tank bottom.

EXAMPLE 5

Management of the Additives

The additives (or dopes), injected in small quantity, act essentially, but strongly, on one of the properties of the mixture. When there is no constraint on the additive flow rate, the doped property may be completely ignored in the optimization-sequence multivariable control problem. A single-variable regulator acting on the flow rate of the additive is then used to regulate this property. This is for example the additive injection controller 18 of the device described above. The operation of such a regulator is described below.

The following preliminary comments should be noted:
the effect on the property affected by the injection of a dope is considered to be instantaneous. However, for any property there exists a measurement delay, which may depend on the measured value. It will be assumed, which is the case in practice, that it is possible to link the measurement delay to the measured value;
the effect of a dope on a property is rather poorly quantified. It varies as a function of the current value of the doped property.

It will be assumed that it is possible to link, even if somewhat imprecisely and for each value taken by the doped property, the variation of the dope flow rate to the variation of the value of the doped property.

The model used is expressed as:

$$\frac{dy}{dt} = K(y)\frac{dv}{dt},$$

where
y is the measured value of the doped property
v is the dope flow rate; and
K is a gain that depends on the current value of the doped property. It will be assumed that there is a piecewise constant function of y for describing this gain.
From a discrete standpoint, at iteration k:

$$\Delta y^k = K(y^k)\Delta v^k.$$

In order for the output, the current value of which is $y^k$, to tend towards its reference value $y^{ref,r}$, it is sufficient that $\Delta v^k = (y^{ref,r} - y^k)/K(y^k)$. However, the value of the available output in k is not the current value, because of the measurement delay. The procedure must therefore be based on calculating the command on an estimate $\hat{y}^k$ of the output and to calculate the command by:

$$\Delta v^k = (y^{ref,r} - \hat{y}^k)/K(\hat{y}^k).$$

The estimate $\hat{y}^k$ is the sum of two terms:
an open-loop estimate K. $\hat{x}^k$ (which uses $K(\hat{y}^k)$),
a filtered bias $\overline{b}^k$, resulting from the first-order filtering of an instantaneous bias, synchronized deviation between measurement and open-loop prediction.

A measurement delay $\delta T$ corresponds to each measurement $y^k$, where T is the sampling period of the command. It will be assumed that a piecewise constant function of y describes this delay. The measurement $y^k$ thus corresponds to an open-loop prediction $\hat{x}^{k-\delta}$, which makes it possible to calculate the instantaneous bias $b^k = y^k - \hat{x}^{k-\delta}$. The filtering coefficient is set automatically according to the measurement delay.

For the command, the following constraints are managed:
maximum variation of the injection by passing to the high level or to the low level;
minimum and maximum injections.

In instantaneous value regulation, it is not possible to input a setpoint outside the extreme values set by the user.

In integrated value regulation, the reference path, which possibly includes taking into account the bottoms of the tanks, is calculated in a similar manner to those employed for the multivariable command. In particular, the instantaneous reference calculated from the setpoint cannot depart from the extreme values set by the user. In practice, this allows the set constraints on the regulated property to be met.

It is possible, when the dope flow rate is saturated (when the command remains equal to the minimum or to the maximum over a predetermined time), to switch to regulation of the doped property via the bases.

In this case, the doped flow rate remains equal to the value taken before the switch.

For a doped output, the cumulative effect due to the dope between time 0 at the start of mixing and the time t is given by:

$$d = \int_0^t K(\hat{y}(\tau))\frac{dv}{dt}(\tau)d\tau$$

i.e., from a discrete standpoint:

$$d^k = d^{k-1} + K(\hat{y}^k)\Delta v^k.$$

When switching to regulation of the property j via the bases, the control model takes this effect into account and is given by:

$$y_j = \hat{B}_j\mu + d.$$

This expression is used both in the successive optimizations and in the dynamic of $\hat{B}_j$ of the feedback system.

EXAMPLE 6

Optimization of the Recipe

When degrees of freedom remain in the solution of the equations used in the optimization, it is possible to optimize the production of the mixture by modifying the recipe, that is to say the respective proportions of each base. Various options optimizing the recipe will be described in this example, for the optimization sequences described in example 3.

In the initial optimization problem P0 described in example 3, it is a question of minimizing the term $\|u - \overline{u}\|^2$.

The value of this reference recipe $\overline{u}$ in this expression depends on the optimization mode chosen by the user.

(a) In the Absence of Optimization
$\overline{u}$ is simply equal to the initial value, that is to say the recipe supplied by the user for the start of mixing.

$\overline{u}$ may also be defined as a "follower" recipe, its value then being equal to the average value of u from the start of mixing.

(b) Optimization of the Incorporation of Certain Bases
It is possible to maximize or minimize the incorporation of certain bases, in excess or on the contrary scarcely available on the production site. In this case, a priority vector $\pi$ has to be associated with the recipe.

This vector includes positive inputs for the bases to be maximized and negative inputs for the bases to be minimized. The bases for which it is not desirable to maximize or minimize the incorporation have a zero priority.

Thus $\pi = (\pi_1, \ldots, \pi_n)^t$ and $|\pi_j| = \max_{i=1,n}|\pi_i|$, assumed to be non-zero.

Denoting the filtered value of u by $u^f$, we use $\overline{u} = u^f + \pi^{f}$, $\pi^{f}$ being the filtered value of:

$$\pi' = (\pi_1/|\pi_j|, \ldots, \pi_n/|\pi_j|)^t.$$

This $\pi'$ filter allows the recipe variations during mixing to be progressively taken into account.

(c) Optimization of the Cost of Mixing
A cost vector $\xi = (\xi_1, \ldots, \xi_n)^t$ is associated with u. A cost of the recipe, based on the filtered recipe of $u^f$: $c = \xi^t u^f$, is defined for each pass.

Next, (c: non-zero) a vector $\xi'$ is defined by:

$$\xi' = ((1-\xi_1/c), \ldots, (1-\xi_n/c))^t.$$

Thus $\xi'_i$, defined by $\xi'_i = (1-\xi_i/c)$, is positive if the cost of the base is below the cost of the current filtered recipe: in this case, it is necessary to seek to incorporate this base in order to limit the cost of the recipe. Conversely, $\xi'_i$ is negative if the cost of the base is greater than the cost of the recipe.

For the optimization, $\bar{u} = u^f + \xi'$.

(d) Saturation of the Specifications on the Outputs

In this case, $\hat{u}$ is equal to the initial recipe, but in fact it has only little importance. This is because if the initial problem P0 has a solution, then the iterative problem described below is initiated.

Let $M = \{1, 2, \ldots, m\}$ be the set of indices assigned to the outputs and let P be the subset of the indices indicating the outputs involved in the optimization procedure.

Associated with each element j of P are:
an element of H, in other words:
either a maximum value not to be exceeded,
or a minimum value not to be gone below;
a threshold $d_j$ relative to the constraint.

Consider a partition of P into p all-non-empty subsets $P_i$, each grouping together indices corresponding to outputs subject to equal-priority optimization requirements. By construction, $p \leq \text{card}(P)$, $$\cup_{i=1}^{p} P_i = P \text{ and } P_i \cap P_j = \emptyset, \forall j \neq i.$$

The optimizations relating to $P_j$ have a lower priority than those relating to $P_i$ whenever $i < j$. Also note that $P_{1j} = \cup_{i=1}^{j} H_j$.

Iteration 1

At the first iteration, the aim is to approach the outputs corresponding to $P_1$ to their constraints:

$$\min_u \left\| \hat{B}_{P_1} u - y_{P_1}^{max} + d_{P_1} \right\|^2$$

$$\begin{cases} u^{min} \leq u \leq u^{max} \\ \sum_{i=1}^{n} u_i = 1 \\ \hat{B}_R u = y_R^{ref} \\ \hat{B}_H u \leq y_H^{max} \\ \hat{B}_S u \leq y_S^{max} \end{cases}$$

The solution u* is used to calculate $y_{P_1}^{min} = \hat{B}_{P_1} u^*$.

Iteration k+1

At the (k+1)th iteration, the following problem is solved:

$$\min_u \left\| \hat{B}_{P_{k+1}} u - y_{P_{k+1}}^{max} + d_{P_{k+1}} \right\|^2$$

$$\begin{cases} u^{min} \leq u \leq u^{max} \\ \sum_{i=1}^{n} u_i = 1 \\ \hat{B}_R u = y_R^{ref} \\ \hat{B}_H u \leq y_H^{max} \\ \hat{B}_S u \leq y_S^{max} \\ \hat{B}_{P_{1k}} u \geq y_{P_{1k}}^{min} \end{cases}$$

The problem is entirely solved when the p subassemblies of constraints of decreasing priority have been addressed during p iterations. The outputs are then as close as possible to their constraints.

EXAMPLE 7

Continuous Hydrodesulphurization Mixer Control

Example 7 shows the regulation of the instantaneous sulphur content value for a mixture produced from several bases.

It may be noted here that this sulphur regulation is accompanied in parallel with the in-zone regulation and monitoring of other properties of the mixture, within a multivariable control context.

This example illustrates the capability of the device to ensure continuous instantaneous control, in order to act on the composition for charging a gasoil hydrodesulphurization unit so as to control the properties of the mixture output by the unit.

It also illustrates the capability of the device to manage complex mixer upstream schemes with several component premixing operations.

The following elements are taken into account:
analyser delays: 5 minutes in the case of density, sulphur content (estimator reset on the corresponding analyser) and the calculated percentage distilled; 10 minutes in the case of the flash point; and 15 minutes in the case of the cloud point;
unit transit dead volumes: 96 m$^3$;
premixing dead volumes: 16.8 m$^3$ and 10.9 m$^3$ in the first premixing stage; 4.5 m$^3$ in the second premixing stage; and 10.8 m$^3$ and 1.4 m$^3$ in the third premixing stage.

The charge components are the following:
Base 1: kerosene;
Base 2: low-sulphur-content kerosene;
Base 3: light gasoil with a low and high sulphur content, coming from an atmospheric distillation;
Base 4: medium gasoil coming from atmospheric and vacuum distillations;
Base 5: FCC LLCO olefinic base, coming from an intermediate tank; and
Base 6: FCC heavy petrol fraction.

Other bases can be used for charging the unit: FCC LLCO, HLCO and HCCS direct streams, VGO direct visbreaking gasoil stream (direct unit stream), recycle from the unit.

The characteristics of the bases 1 to 5 measured in the laboratory are given in Table 2 below:

TABLE 2

Characteristics of the bases of example 7

|  | Base 1 | Base 2 | Base 3 | Base 4 | Base 5 |
|---|---|---|---|---|---|
| Density (at 15° C.) | 0.7995 | 0.8279 | 0.8558 | 0.883 | 0.835 |
| Flash point (° C.) | 42.5 | 66 | 77 | 52.5 | 50 |
| Cloud point (° C.) | −48.09 | −19.9 | 8.401 | −29.96 | −30.97 |
| Cetane number | 45.97 | 54.8 | 57.77 | 25.3 | 23.5 |
| Percentage distilled at 360° C. (%) | 100 | 100 | 89.8 | 100 | 100 |
| Sulphur content (ppm) | −19.39 | 54.9 | 99.71 | 40.08 | 30.03 |

The minimum thresholds are soft thresholds for all the properties except for the flash point and the cetane number.

The maximum thresholds are hard thresholds for all the properties except for the cetane number, the flash point and the percentage distilled.

The values of these maximum and minimum thresholds used for the various properties are the following:

TABLE 3

Values of the maximum and minimum thresholds of the properties of the mixture of example 7

| Property: | Maximum threshold | Minimum threshold |
|---|---|---|
| Density | 0.844 | 0.82 |
| Flash point (° C.) | 65 | 57 |
| Cloud point (° C.) | −6 | −15 |
| Cetane number | 53 | 46.5 |
| Percentage distilled (%) | 100 | 95 |
| Sulphur content (ppm) | 48 | 30 |

The reference path horizons used are defined as being equal to twice the analyser delay, increased by parameterizable values called reduced horizons. The reduced horizons used are the following: 10 minutes in the case of the density, the cetane number, the sulphur content and the percentage distilled; 20 minutes for the flash point; and 30 minutes for the cloud point.

The filtering coefficients used for adjusting the estimator are the following: 15 minutes for the density, the cetane number, the percentage distilled and the sulphur content; 30 minutes for the flash point; and 45 minutes for the cloud point. These filtering coefficients (the inverses of the $\beta_i$ appearing in formulae (1) and (2) defined above) correspond to the component parameters of the vector $\beta$ that are used in the differential equations of the estimator, making it possible for the relatively rapid rate of convergence to be controlled, property by property.

Recipe optimization objectives are also used to maximize the use of base 1 (kerosene) and base 4 (medium distillation gasoil).

At the start of mixing, the minimum and maximum values of the sulphur content are 30 and 48 ppm respectively. The thresholds are then modified, passing to 2 and 8 ppm respectively. The sulphur is "in zone" regulated within its minimum and maximum limits. It is this transition from the [30, 48] threshold to the [2, 8] threshold that allows switching from the 50 ppm step (the aim here is to have a sulphur content close to 48 ppm in order to have a manufacturing margin of 2 ppm) to the 10 ppm step (the aim here is to have a sulphur content close to 8 ppm, so as to have a manufacturing margin of 2 ppm).

The mixture topology is specified in Table 4.

TABLE 4

Topology of the mixture of example 7

| Base 1 (75) | Mixture A = | | Final mixture = |
| Base 2 (121) | bases 1 + 2 | | A + C + Base 6 |
| Base 3 (79) | Mixture B = | Mixture C = | |
| Base 4 (74) | bases 3 + 4 | B + base 5 | |
| Base 5 (63) | | | |
| Base 6 (8) | | | |

Figure 4:
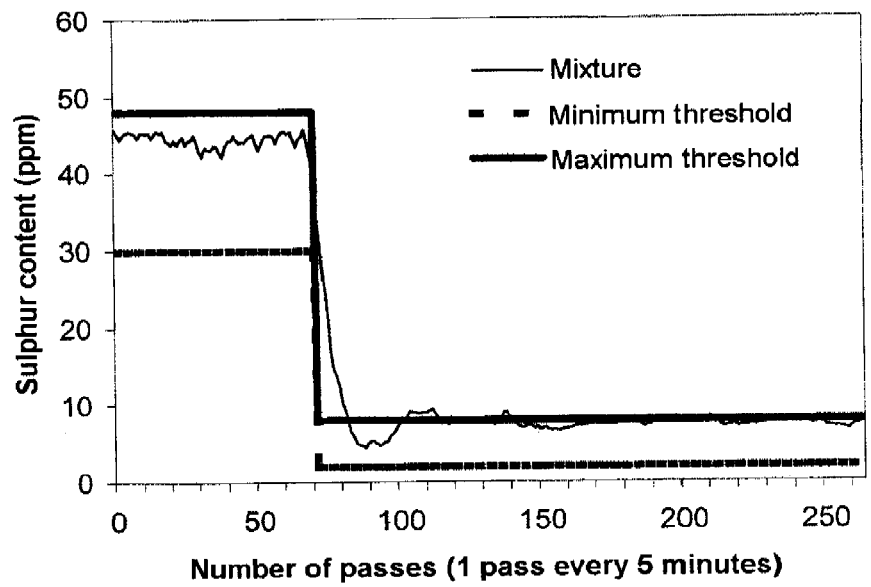
FIG. 4 shows the variation of the sulphur content of the mixture of example 7 as a function of time.

FIG. 4 shows the variation in the sulphur content of the mixture during a rapid transition from the 50 ppm step to the 10 ppm step as a function of the number of passes, each pass corresponding to 5 minutes. Each pass corresponds to a new implementation of the device according to the invention (and therefore to a new iteration of the control method according to the invention) and especially to the transmission of a new recipe calculated by the device and applied to the equipment.

This setpoint transition is in fact provided by modifying the minimum and maximum thresholds, knowing that the sulphur regulation is carried out here in zone, that is to say between its minimum and its maximum. This sulphur content quality therefore does not have a fixed setpoint-type target, but it is the high-limit and low-limit constraints on this sulphur content quality which here are taken into account by the optimizer and which define a target range of variation for this quality.

It will be noted that the sulphur content of the mixture at any moment remains close to the desired value, and rapidly follows the setpoint reduction command, without undergoing large sudden changes in value.

The estimator according to the invention makes it possible not only to ensure regulation of the sulphur content on leaving the unit but also the in-zone regulation of the density, the flash point, the cloud point, the cetane number and the percentage distilled (the flash point is in minimum constraint, while the sulphur content and the cloud point are in maximum constraint).

Figure 5:
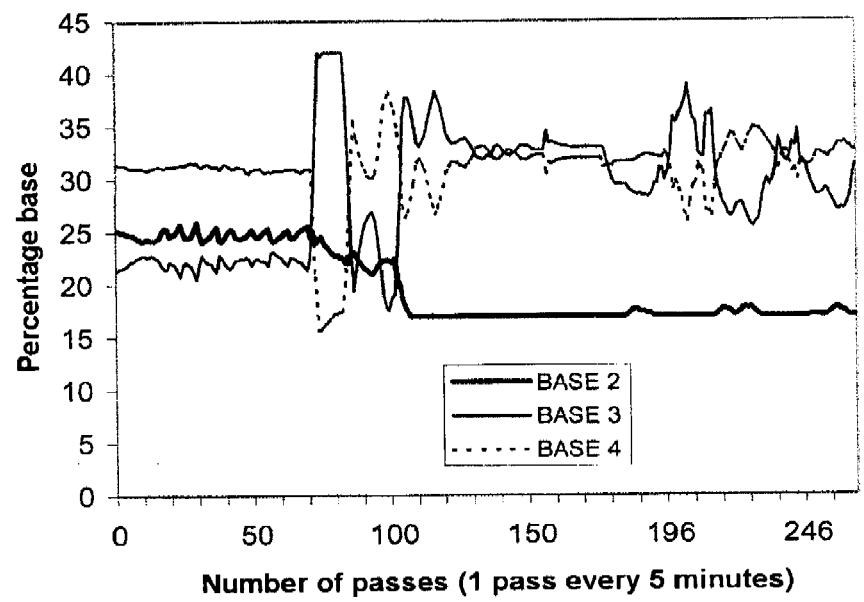
FIG. 5 shows the variation of the proportions of the bases of the mixture of example 7 as a function of time.

FIG. 5 shows the variation in consumption of the bases 2 to 4 used during modification of the sulphur content command, the bases 1, 5 and 6 not being injected for producing the mixture. The calculated component proportion profiles shown in the figure make it possible to obtain the desired results with respect to the properties on leaving the unit.

EXAMPLE 8

Petrol Mixture in Tank-bottom-integrated Mode (without Premixing)

Figure 6A:
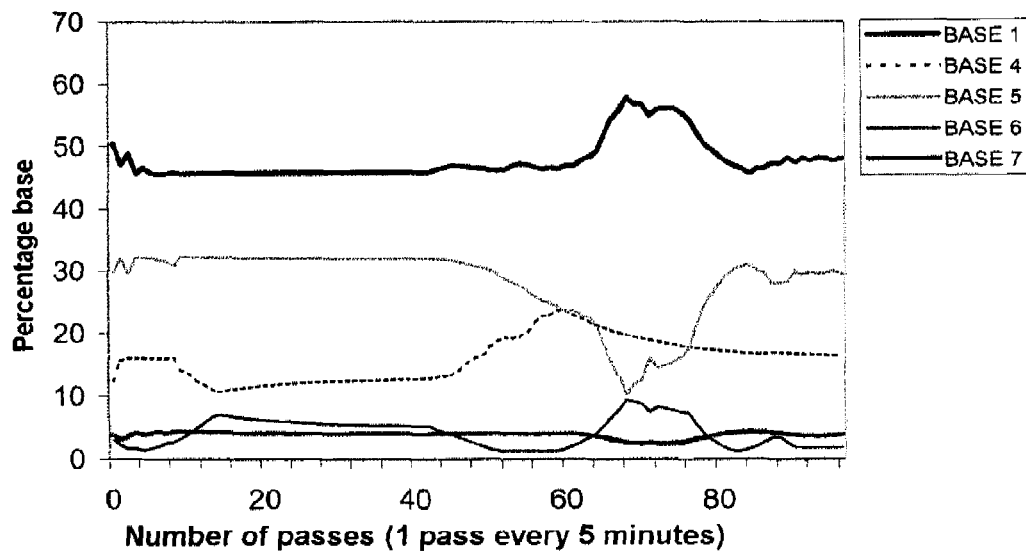

FIGS. 6a-e show the variation in time of the ratio of the bases (FIG. 6a), regulations on the RON (research octane number) and on the RVP (Reid vapour pressure) (FIGS. 6b and 6c respectively) and the in-zone monitoring of the percentage distilled at 100° C. (FIG. 6d) and the benzene content (FIG. 6e).

Figure 6B:
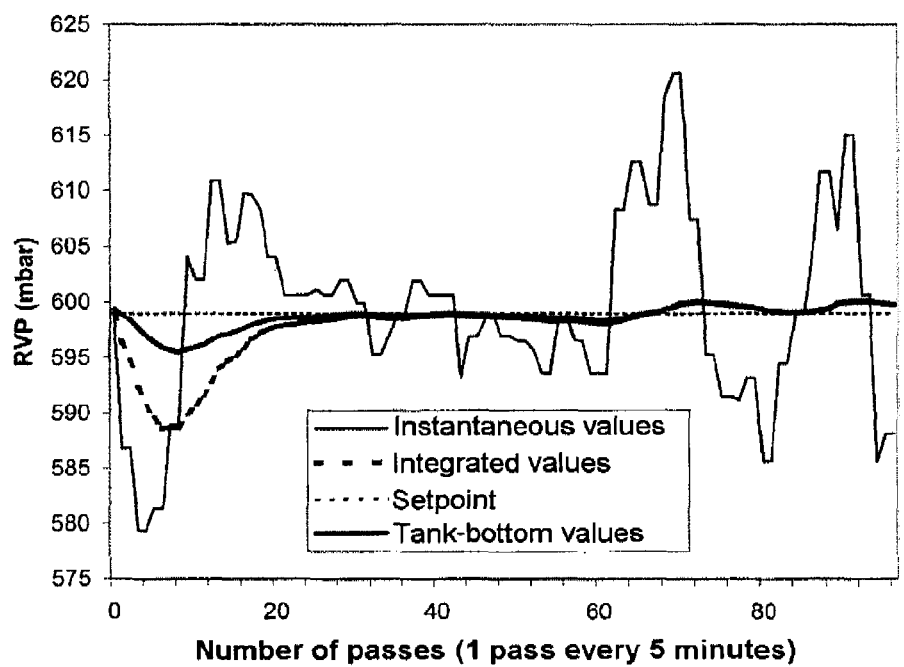
Figure 6C:
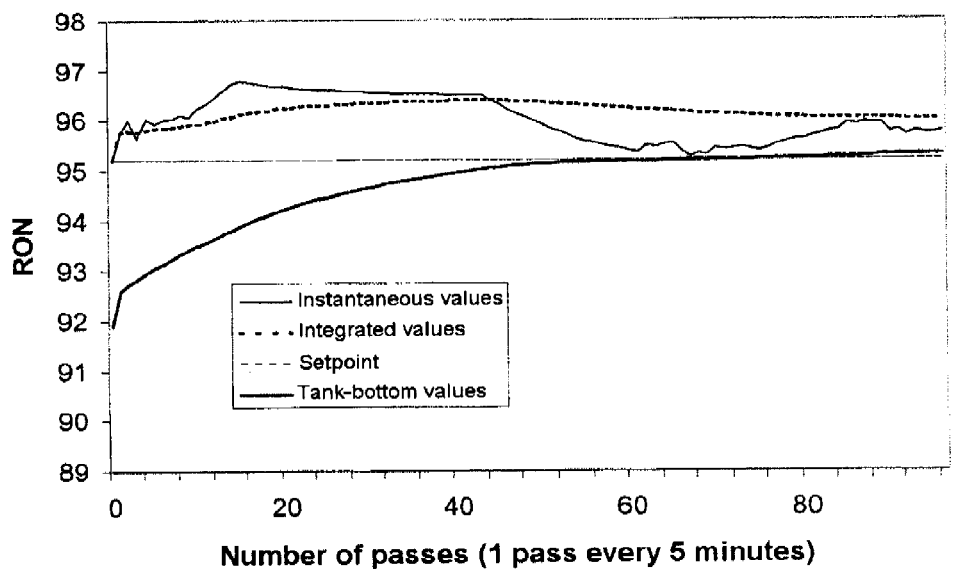
Figure 6D:
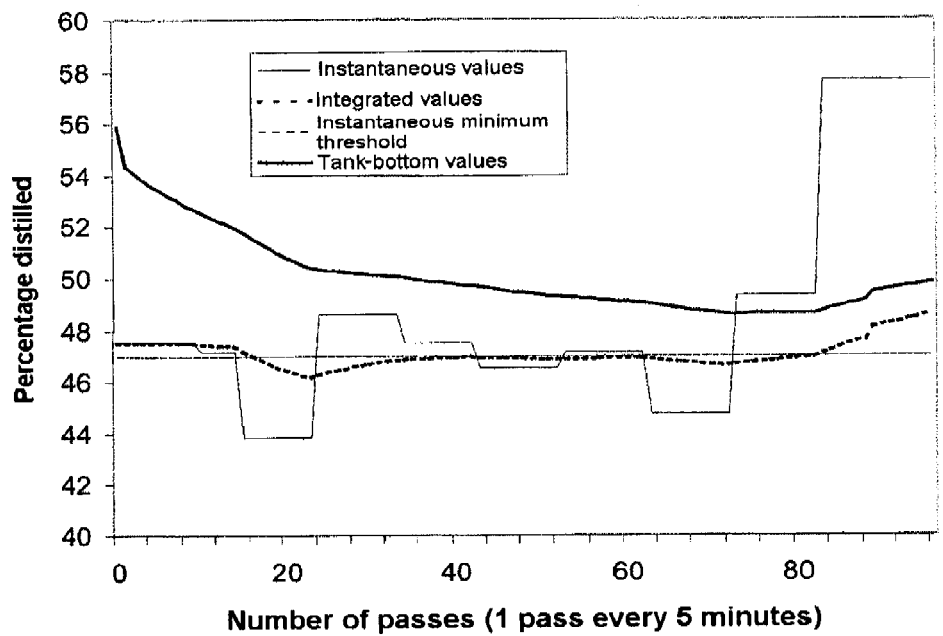

The tank-integrated values, the instantaneous values and the setpoints are shown in FIGS. 6a to 6c.

The values relating to the benzene content, to the percentage distilled at 100° C., to the MON (motor octane number), to the RON (research octane number) and to the RVP (Reid vapour pressure) are given in the following table for the various component bases:

TABLE 5

Property values of the bases of example 8

| | Base 1 | Base 4 | Base 5 | Base 6 | Base 7 |
|---|---|---|---|---|---|
| Benzene content (%) | 1.050 | 0 | 1.130 | 0 | 0 |
| Percentage distilled at 100° C. (%) | 64.9 | 29.6 | 6.9 | 100.0 | 125.0 |
| MON | 80.0 | 93.0 | 91.5 | 101.0 | 86.0 |
| RON | 89.90 | 95.10 | 102.40 | 113.00 | 96.00 |
| RVP (mbar) | 565.89 | 454.00 | 186.37 | 551.90 | 4000.59 |

This example demonstrates the operation of the regulation with tank-bottom compensation. Two qualities, namely the vapour pressure and the octane number, converge while two other qualities, namely the percentage distilled at 100° C. and the benzene content, are maintained within their admissible range.

The minimum and maximum values of the regulated and monitored qualities are provided in [min/max] form and are the following:

Benzene content (%): [0/0.95];
Percentage distilled at 100° C. (%): [47/70];
RON: [95.199/96.50] with the minimum value 95.199 as setpoint; and
RVP (mbar): [459.99/599.86], with a setpoint of 598.86.

It may be seen at around pass 70 in the second half of the mixing that there is increased activity on the bases because, since the quality of the percentage distilled at 100° C. has reached its low (minimum) limit, the recipe is automatically modified in order to raise its value and keep it above its minimum threshold, while still maintaining the other regulated and monitored properties at their target values.

This example illustrates the capability of the device to control the mixing in integrated mode with tank-bottom compensation by making it possible to control both fixed-setpoint-regulated qualities and monitored qualities in their minimum/maximum zone.

EXAMPLE 9

Gasoil Mixture, Regulation of Dopes (without Premixing)

FIG. 7

This example demonstrates the operation of the regulation by injecting additives or dopes.

Two properties: cetane number and filterability here are regulated by dopes. A third property (sulphur content) is regulated in parallel by mixing two bases, a third base being blocked on a fixed ratio.

The following table provides the values relating to the sulphur content, the filterability and the cetane number of the three bases.

TABLE 6

Properties of the bases of example 9

|  | Base 1 | Base 3 | Blocked base |
|---|---|---|---|
| Sulphur content (ppm) | 30 | 246 | 3 |
| Filterability (° C.) | 0 | −30 | −12 |
| Cetane number | 52 | 52 | $-1e^{+6}$ |

The base called "blocked base" is injected with a constant ratio of 1.5%.

The sulphur content is regulated on a 45 ppm setpoint, the filterability on a −16° C. setpoint and the cetane number on a 52 setpoint.

As indicated in FIGS. 7a-e:

FIG. 7a shows that the injection of pro-cetane additive is lowered until this injection is cut off in the middle of mixing, in order to lower the integrated cetane number (FIG. 7d), which gently joins its setpoint and is maintained thereat.

FIG. 7b shows the filterability dope injections, with three peaks corresponding to the small oscillations in the integrated filterability, seen in FIG. 7e. This denotes a reactively adjusted regulation.

FIG. 7c gives the profiles of the bases used for regulating the sulphur content. These profiles are quite steady, apart from a peak in the middle of mixing as a result of the peak observed in the instantaneous sulphur measurement in FIG. 7f, due to a discrete perturbation.

The integrated sulphur content is coincident with its setpoint in FIG. 7f and has not been affected by the discrete perturbation in the middle of mixing.

This example illustrates the capability of the device to provide simultaneous mixture-integrated control, by controlling the mixture components and by injecting several additives in order to control various properties of the mixture.

The invention claimed is:

1. A device for producing and controlling production of a mixture M of n components, the device comprising:
   transport channels for transporting the components to be mixed into a main channel connected to a place for receiving the mixture M;
   flow rate regulators for controlling the rate of flow of the components in each transport channel;
   in-line analysers located in the main channel for continuously measuring representative parameters of the mixture M being produced;
   a non-transitory readable memory configured to store:
   a computer-implemented calculating program configured to calculate proportions u of the components involved in the mixture; and
   a computer-implemented estimating program for estimating the properties of the components using the measurements of the properties of the mixture that are measured by the in-line analysers, and the computer-implemented calculating program calculates the proportions u of the components involved in the mixture using the estimate so as to obtain a mixture having predetermined properties y; and
   wherein the computer-implemented estimating program is configured to implement the following operations:
   (i) at time t=0:
      (1) determine a matrix B representing a number m of the properties y of the n components, and
      (2) determine a reference recipe $\bar{u}$ from predetermined minimum and maximum thresholds and/or from the predetermined target values, such that properties $B\bar{u}$ of the mixture lie between said predetermined thresholds and/or, for m' of them, where m'≤n−1, are equal to predetermined target values,
      $\bar{u}$, being a vector of dimension n, representing the proportions of the various components involved in the composition of the mixture, where $$\sum_{i=1}^{n} \bar{u}_i = 1;$$

(ii) at time t'=t+Δt:
      (1) measure the properties $y_{mes}$ of the mixture M obtained by applying the recipe calculated at time t=0, and
      (2) deduce therefrom a corrected matrix $\hat{B}$, representing the estimate of the
   properties of the components; and
   a processor configured to execute the computer-implemented calculating program and the computer-implemented estimating program stored in the memory to produce and control the production of the mixture M.

2. The device according to claim 1, wherein the memory is further configured to store a computer-implemented synchronization program for taking into account the delays due to the dead volumes in the zones for premixing at least two components of the mixture M, wherein the computer-implemented synchronization program accounts for at least on delay due to the dead volume in the zones for premixing and wherein the processor is further configured to execute the computer-implemented synchronization program stored in the memory to produce and control the production of the mixture M.

3. The device according to claim 1, wherein the memory is further configured to store a computer-implemented synchronization program for taking into account the delays due to the dead volumes in various stages, wherein the computer-implemented synchronization program accounts for at least one delay due to the dead volume in the zones for premixing for several stages, at least one stage consisting of one or more zones for premixing at least two components of the mixture M; and wherein the processor is further configured to execute the computer-implemented synchronization program stored in the memory to produce and control the production of the mixture M.

4. The device according to claim 2, wherein the computer-implemented synchronization program is configured to deduce corrected matrix $\hat{B}$ using the following equation:

$$\frac{d\hat{B}_j^t}{dt} = -\beta_j H U(t)(y_t(t) - y_j^{mes}(t)),$$

where $U(t)=(U_1(t), \ldots U_n(t))^t$, at time t, the recipe vector taking into account the dead volumes, and $$y(t) = \sum_{i=1}^{n} U_i(t) b_i,$$

$b_i$ being the vector of the properties of component i, where
  the matrix H is a positive definite symmetric matrix having the objective of ensuring normalization taking into account the measurement-prediction deviation, allowing component quality prediction deviation calculation;
  $B_j^t$ is the transpose of $B_j$ and
  $\beta_j$, a strictly positive real number, is a constant for setting the convergence time, allowing the rate of convergence of the estimate to be differentiated property by property.

5. The device according to claim 1, wherein the memory is further configured to store a computer-implemented optimization program configured to optimize the recipe u of the proportions of the components, and wherein the memory is connected to the processor configured to execute the computer-implemented calculating program, and wherein the processor also stores mixture objectives, said recipe u being determined by the computer-implemented calculating program as a function of the mixture objectives stored in the computer.

6. The device according to claim 5, wherein the computer-implemented optimization program is configured to implement an optimization procedure to determine the recipe u in such a way that the properties $\hat{B}u$ of the mixture lie between said predetermined thresholds and/or, for m' of them, and equal to said predetermined target values, wherein the optimization procedure includes the following operations:
  (a)—determine the solution of a complete regulation problem P0, the solution consisting of recipe u taking into account the constraints on the proportions of the components and constraints on the properties of the mixture, and
  apply the recipe u if the complete regulation problem P0 is solvable;
  (b)—determine recipe u for which a minimal regulation problem P1 is solved, if the complete regulation problem P0 is not solvable, which takes into account only constraints on the problem P0 that are defined as priority constraints; the problem P1 involving a succession of normally feasible optimization problems, the criteria of which consist in penalizing the violation of said priority constraints so as to define achievable new values for the priority constraints;
  (c)—determine a recipe u for which a regulation problem P2 is solved, if the minimal regulation problem P1 is solvable, which takes into account said achievable new values of the priority constraints of the problem P0 and also non-priority constraints of the problem P0; the problem P2 involving an optimization problem, the criteria of which consist in penalizing the violation of non-priority constraints so as to define achievable new values for the non-priority constraints, or
  apply the current recipe u if the minimal regulation problem P1 is not solvable;
  (d)—determine recipe u for which a regulation problem P3 is solved, if the regulation problem P2 is solvable, which takes into account said achievable new values of the priority constraints of the problem P0 obtained in step (b), said achievable new values of the non-priority constraints obtained in step (c) and also all other non-priority constraints of the problem P0 not treated by the problems P1 and P2; the problem P3 involving a succession of normally feasible optimization problems, the criteria of which consist in penalizing the violation of said other non-priority constraints so as to define achievable new values for the other non-priority constraints, or
  apply the recipe obtained by the problem P1 if the regulation problem P2 is not solvable; and
  (e) apply recipe u that is the solution of the problem P3 if the regulation problem P3 is solvable, otherwise apply recipe u that is the solution of the problem P2.

7. The device according to claim 6, further comprising at least one additive tank connected via a transport channel to the main channel, downstream of the zone for mixing the components, and an additive injection controller connected to the memory, wherein the memory is further configured to store a computer-implemented controlling program for controlling the additive flow rate associated with the tank provided in the transport channel, the additive injection controller being capable of optimizing the proportion of the additive so as to regulate a property j of the mixture on which an additive had an influence taking into account a target supplied by flow rate regulators, and wherein the processor is further configured to execute the computer-implemented controlling program.

* * * * *